United States Patent
Cao et al.

(10) Patent No.: US 9,892,543 B2
(45) Date of Patent: Feb. 13, 2018

(54) SYSTEMS AND METHODS FOR ESTIMATING POSE OF TEXTURELESS OBJECTS

(71) Applicant: Carnegie Mellon University, Pittsburgh, PA (US)

(72) Inventors: Zhe Cao, Pittsburgh, PA (US); Natasha Banerjee, Hannawa Falls, NY (US); Yaser Sheikh, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 15/054,773

(22) Filed: Feb. 26, 2016

(65) Prior Publication Data
US 2017/0249776 A1    Aug. 31, 2017

(51) Int. Cl.
*G06T 15/00*    (2011.01)
*G06T 15/04*    (2011.01)
(Continued)

(52) U.S. Cl.
CPC ............ *G06T 15/04* (2013.01); *G06T 7/75* (2017.01); *G06T 15/506* (2013.01);
(Continued)

(58) Field of Classification Search
CPC .............. G06K 9/42; G06K 9/4604; G06T 2207/30244; G06T 7/73; G06T 2207/10028; G06T 7/593; G06T 7/0051
(Continued)

(56) References Cited

U.S. PATENT DOCUMENTS 7,756,325 B2   7/2010   Vetter et al.
8,437,537 B2   5/2013   Chang et al.
(Continued)

FOREIGN PATENT DOCUMENTS

| EP | 2048599 A1 | 4/2009 |
|---|---|---|
| NO | 2013029673 | 3/2013 |
| WO | 2015123646 | 8/2015 |

OTHER PUBLICATIONS

Wu, C., Clipp, B., Li, X., Frahm, J.M. and Pollefeys, M., Jun. 2008, 3D model matching with viewpoint-invariant patches (VIP). In Computer Vision and Pattern Recognition, 2008. CVPR 2008. IEEE Conference on (pp. 1-8). IEEE.*

(Continued)

*Primary Examiner* — Phu K Nguyen
(74) *Attorney, Agent, or Firm* — Dinsmore & Shohl LLP

(57) ABSTRACT

Systems and methods for estimating the pose of a textureless object are disclosed. A method to estimate a pose of a textureless object includes obtaining, by a processing device, a single image of the textureless object. The pose of the textureless object can be inferred from the single image. The method further includes generating, by the processing device, a three dimensional model of the textureless object from a plurality of viewpoints and a plurality of scales obtained from image data of the textureless object, matching, by the processing device, the single image with a discretized render of the three dimensional model via a multi-level illumination invariant tree structure to obtain an alignment of the single image with the discretized render, and estimating, by the processing device, the pose of the textureless object based on the alignment.

20 Claims, 15 Drawing Sheets

(51) Int. Cl.
*G06T 15/50* (2011.01)
*G06T 17/00* (2006.01)
*G06T 19/20* (2011.01)
*G06T 7/73* (2017.01)

(52) U.S. Cl.
CPC ............ *G06T 17/005* (2013.01); *G06T 19/20* (2013.01); *G06T 2219/2004* (2013.01)

(58) Field of Classification Search
USPC ........................................................ 345/419
See application file for complete search history.

(56) References Cited

U.S. PATENT DOCUMENTS

| | | | | |
|---|---|---|---|---|
| 8,447,120 | B2* | 5/2013 | Ji | G06F 17/30265 |
| | | | | 382/226 |
| 8,675,972 | B2 | 3/2014 | Lefevre et al. | |
| 8,761,457 | B1* | 6/2014 | Seitz | G06K 9/6202 |
| | | | | 382/113 |
| 9,075,826 | B2* | 7/2015 | Shen | G06F 17/30247 |
| 9,378,431 | B2* | 6/2016 | Stoeffler | G06K 9/6202 |
| 2014/0254874 | A1* | 9/2014 | Kurz | G06K 9/42 |
| | | | | 382/103 |
| 2015/0071524 | A1 | 3/2015 | Lee | |

OTHER PUBLICATIONS

Cao, Zhe, Yaser Sheikh, and Natasha Kholgade Banerjee. "Real-time scalable 6DOF pose estimation for textureless objects." Robotics and Automation (ICRA), 2016 IEEE International Conference on. IEEE, 2016.*

International Search Report and Written Opinion issued in corresponding PCT Application No. PCT/US2017/017909, dated May 23, 2017.

Zhe Cao et al., Real-time scalable 6DOF pose estimation for textureless objects, 2016 IEEE International conference on Robotics and Automation (ICRA), May 16-21, 2016 pp. 2441-2448, Stockholm, Sweden.

Clemens Von Bank et al., A Visual Quality Inspection System Based on a Hierarchical 3D Pose Estimation Algorithm, Network and Parallel Computing, Jan. 1, 2003 (Jan. 1, 2003), Springer International Publishing, Cham 032548.

* cited by examiner

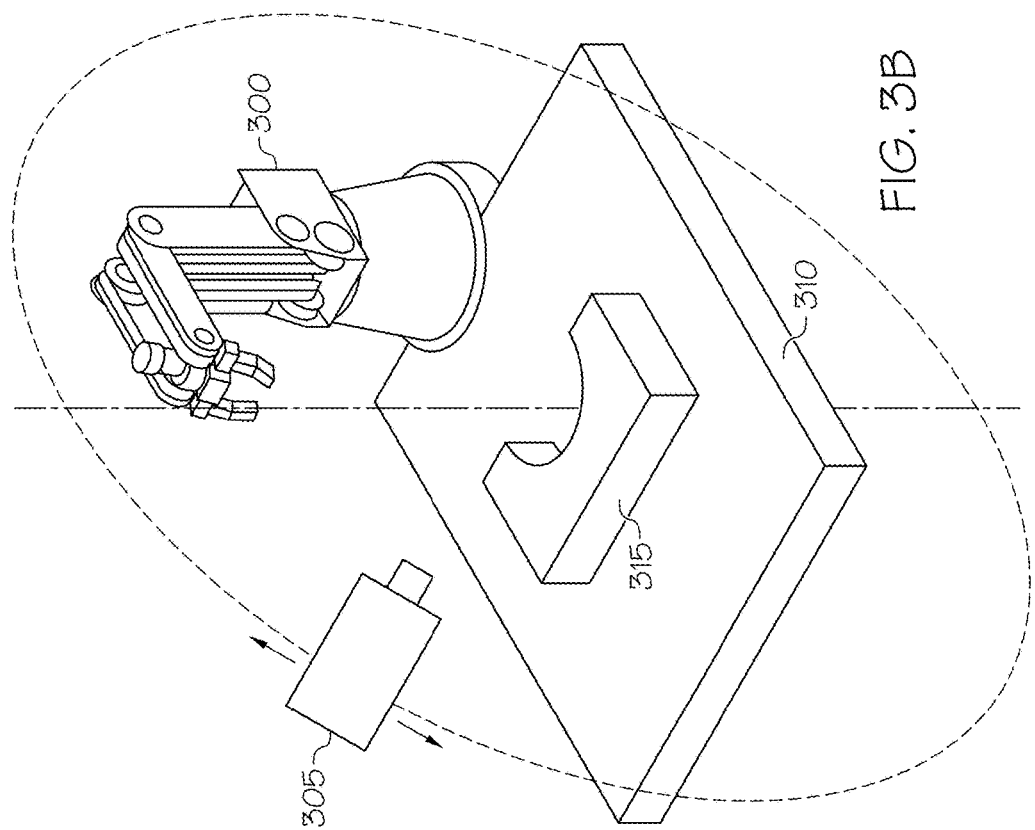

SYSTEMS AND METHODS FOR ESTIMATING POSE OF TEXTURELESS OBJECTS

TECHNICAL FIELD

The present specification generally relates to pose estimation and, more specifically, to systems and methods that are used by robotic grasping devices to estimate a location and positioning of a textureless object.

BACKGROUND

Previous attempts of using artificial intelligence to determine the location and positioning of an object included aligning 3D models parameterized in terms of low-level primitives such as blocks, generalized cylinders, and deformable superquadratics to images. One such attempt included aligning 3D models represented as 3D meshes of vertices and faces to images. This attempt was limited to instances where the target object was "clean" such that the target object was composed of low-level primitives, the images thereof had strong gradients, and/or the underlying 3D shapes precisely matched a known 3D model. Solutions to this issue have resulted in approaches that have focused on developing representations, such as histograms of gradients, to improve the similarity between images by providing invariance to low-level features. However, the invariance to low-level features has precluded precise alignment.

Accordingly, a need exists for a fully automated approach to perform precise alignment of 3D models to objects in single images of the objects.

SUMMARY

In one embodiment, a system to output a pose of a textureless object includes a processing device and a non-transitory, processor-readable storage medium. The non-transitory, processor-readable storage medium includes one or more programming instructions that, when executed, cause the processing device to obtain a single image of the textureless object. The pose of the textureless object can be inferred from the single image. The non-transitory, processor-readable storage medium further includes one or more programming instructions that, when executed, cause the processing device to generate a three dimensional model of the textureless object from a plurality of viewpoints and a plurality of scales obtained from image data of the textureless object, extract a plurality of patches from each of a plurality of discretized renders of the three dimensional model, where the plurality of patches comprises a plurality of high-level patches and a plurality of low-level patches, link each one of the plurality of high-level patches to at least one of the plurality of low-level patches to construct a multi-level illumination invariant tree structure, match the single image with a discretized render of the three dimensional model via the multi-level illumination invariant tree structure to obtain an alignment of the single image with the discretized render, and output the pose of the textureless object based on the alignment.

In another embodiment, a method to estimate a pose of a textureless object includes obtaining, by a processing device, a single image of the textureless object. The pose of the textureless object can be inferred from the single image. The method further includes generating, by the processing device, a three dimensional model of the textureless object from a plurality of viewpoints and a plurality of scales obtained from image data of the textureless object, matching, by the processing device, the single image with a discretized render of the three dimensional model via a multi-level illumination invariant tree structure to obtain an alignment of the single image with the discretized render, and estimating, by the processing device, the pose of the textureless object based on the alignment.

In yet another embodiment, a system to direct a robotic device based on a pose of a textureless object includes a processing device, one or more imaging devices communicatively coupled to the processing device, the robotic device communicatively coupled to the processing device, a picking surface supporting the textureless object, and a non-transitory, processor-readable storage medium. The non-transitory, processor-readable storage medium includes one or more programming instructions that, when executed, cause the processing device to obtain a single image of the textureless object from at least one of the one or more imaging devices. The pose of the textureless object can be inferred from the single image. The non-transitory, processor-readable storage medium further includes one or more programming instructions that, when executed, cause the processing device to generate a three dimensional model of the textureless object from a plurality of viewpoints and a plurality of scales obtained from image data of the textureless object generated by the one or more imaging devices, match the single image with a discretized render of the three dimensional model via a multi-level illumination invariant tree structure to obtain an alignment of the single image with the discretized render, estimate the pose of the textureless object based on the alignment, and direct the robotic device to move and grasp the textureless object based on the estimated pose.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3B schematically depicts another illustrative picking surface containing a textureless object according to one or more embodiments shown and described herein;

DETAILED DESCRIPTION

Figure 1:
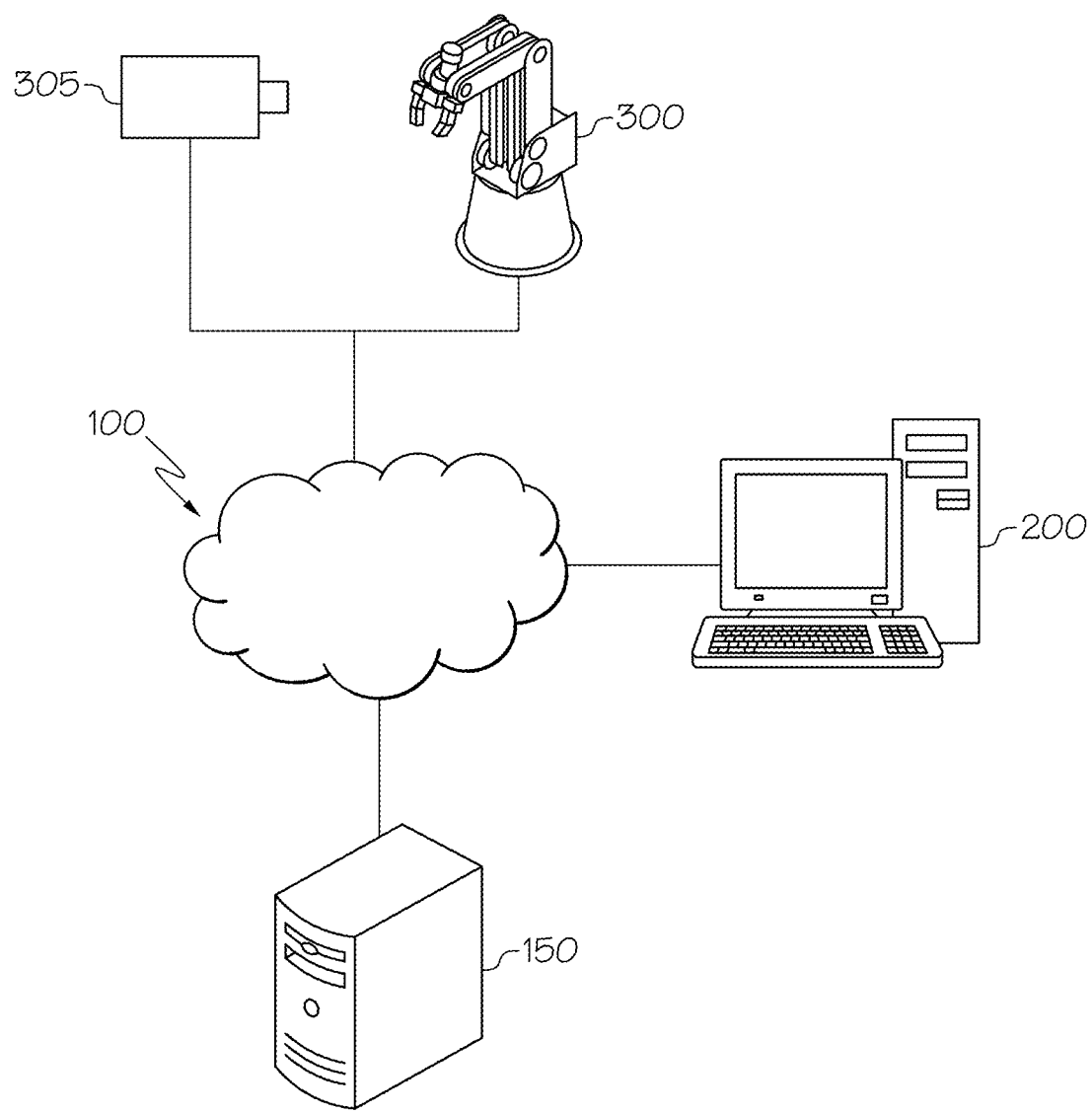
FIG. 1 schematically depicts an illustrative computing network for a system to estimate a pose of a textureless object according to one or more embodiments shown and described herein.

The embodiments described herein are generally directed to systems and methods for estimating the pose of a textureless object. Estimation of the pose of an object is necessary such that a robotic device, such as a robotic picking device or the like, can accurately grasp and manipulate the object without dropping the object, mishandling the object, and/or damaging the object.

As used herein, a "textureless object" refers to any object that is substantially devoid of surface features that have been traditionally used by pose estimation systems to determine the pose of an object. For example, a textureless object may include an object that has a smooth surface, a rounded surface, a surface that does not contain any distinguishing markings, and/or the like. Thus, existing pose estimation systems and methods cannot determine the positioning of a textureless object because it lacks certain reference points that are necessary for estimation. In some embodiments, the textureless object may be an object that is selected by a robotic device, grasped by the robotic device, and/or manipulated and moved by the robotic device. Illustrative textureless objects may include, but are not limited to, textureless automotive components and/or the like.

The approach for estimating the pose as described herein includes aligning a 3D model of the textureless object to a single image of the object by densely sampling the space of poses around the 3D model. The space of poses is populated by rendering the 3D model from a plurality of viewpoints and scales. To precisely match a discretized render while retaining invariance to illumination, a multi-level illumination invariant tree structure is presented. The multi-level illumination invariant tree structure allows for leveraging of dynamic programming to simultaneously estimate the location of several patches at various levels of resolution in the image. Simultaneous localization of patches allows for the leveraging of the distinctiveness of high level patches and the precision of low level patches to obtain the best matching viewpoint and to obtain precise alignment of the 3D model to the image.

The systems and methods disclosed herein can increase the speed and scalability of a detection-based approach of multiple RGB-D object pose estimation. For example, in some embodiments disclosed herein, the systems and methods may estimate the pose for 15 objects in a 320×240 image at 23 frames per second, where each object has templates sampled with 600 viewpoints and 12 scales. The systems and methods described herein can increase the number of objects with a sub-linear runtime increase.

As used herein, "pose" generally refers to how a textureless object appears to an imaging device when viewed by the imaging device, including information that indicates a positional location of the textureless object that is extractable as pose information from images obtained by the imaging device. That is, pose may refer to a location and a positioning of a textureless object with respect to other objects, such as, for example, a surface supporting the object, a robotic device, other textureless objects adjacent to the textureless object, various imaging devices, boundaries of the surface, and/or the like.

As used herein, a "patch" refers to a single section or a minimal surface element of a particular geometry. Accordingly, the particular geometry may correspond to one or more patches. If a 3D mesh is comprised of triangles, a patch may thus correspond to the geographic area of a small triangle. A specularity for a piece of geometry may be determined for each individual triangle or a patch. In some embodiments, a patch may refer to a collection of triangles or a polygon of a 3D mesh. In addition, the triangles of the mesh may be reconfigured into a set of modest-sized, generally uniformly shaped triangle patches by iterating longest-edge bisection and edge collapse operations.

Referring now to the drawings, FIG. 1 depicts an illustrative computing network that depicts components for a system that estimates the pose of a textureless object, according to embodiments shown and described herein. As illustrated in FIG. 1, a computer network 100 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 100 may generally be configured to electronically connect one or more computing devices and/or components thereof, one or more imaging devices, and/or one or more robotic devices. Illustrative computing devices may include, but are not limited to, a user computing device 200 and a server computing device 150. An illustrative imaging device may include, but is not limited to, an imaging device 305 configured to capture one or more images of a textureless object, as described in greater detail herein. An illustrative robotic device may include, but is not limited to, a robotic device 300 that is configured to move into a position that allows it to effectively grasp, manipulate, and/or move a textureless object, such as a robotic picking device or the like, as described in greater detail herein. As will be further described herein, the robotic device 300 and the imaging device 305 may be separate devices or may be integrated into a single device.

The user computing device 200 may generally be used as an interface between a user and the other components connected to the computer network 100. Thus, the user computing device 200 may be used to perform one or more user-facing functions, such as receiving one or more inputs from a user or providing information to the user. Additionally, in the event that the server computing device 150 requires oversight, updating, or correction, the user computing device 200 may be configured to provide the desired oversight, updating, and/or correction. The user computing device 200 may also be used to input additional data into a data storage portion of the server computer device 150.

The server computing device 150 may receive electronic data and/or the like from one or more sources (e.g., an imaging device 305 and/or one or more databases), determine a pose of one or more textureless objects based on the received electronic data, and/or direct the various components connected to the computer network 100 to move. For example, the server computing device 150 may direct the imaging device 305 to move relative to a textureless object, direct the imaging device 305 to zoom in or out on a textureless object, direct the robotic device 300 to move relative to a textureless object and/or grasp a textureless object, as described in greater detail herein.

It should be understood that while the user computing device 200 is depicted as a personal computer and the server computing device 150 is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing device 200 and the server computing device 150 may represent a plurality of computers, servers, databases, components, and/or the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 2A:
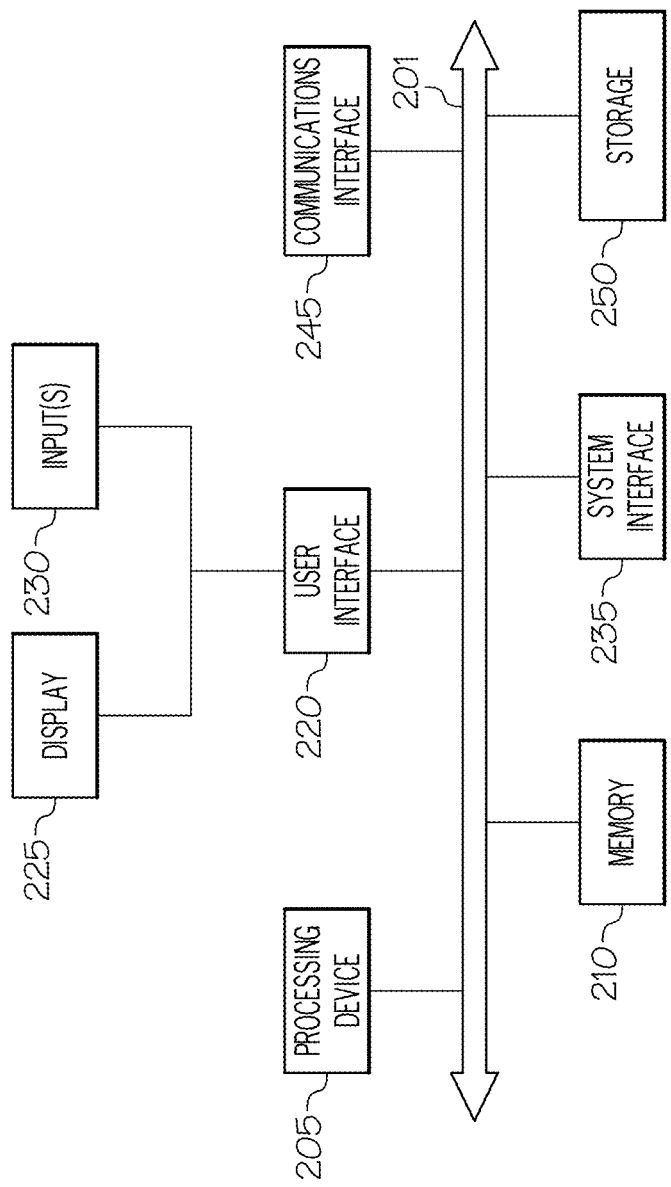
FIG. 2A schematically depicts a block diagram of illustrative hardware of a computing device that is used to estimate a pose of a textureless object according to one or more embodiments shown and described herein.

Illustrative hardware components of the user computing device 200 and/or the server computing device 150 are depicted in FIG. 2A. A bus 201 may interconnect the various components. A processing device 205, such as a computer processing unit (CPU), may be the central processing unit of the computing device, performing calculations and logic operations required to execute a program. The processing device 205, alone or in conjunction with one or more of the other elements disclosed in FIG. 2, is an illustrative processing device, computing device, processor, or combination thereof, as such terms are used within this disclosure. Memory 210, such as read only memory (ROM) and random access memory (RAM), may constitute illustrative memory devices (i.e., non-transitory processor-readable storage media). Such memory 210 may include one or more programming instructions thereon that, when executed by the processing device 205, cause the processing device 205 to complete various processes, such as the processes described herein. Optionally, the program instructions may be stored on a tangible computer-readable medium such as a compact disc, a digital disk, flash memory, a memory card, a USB drive, an optical disc storage medium, such as a Blu-ray™ disc, and/or other non-transitory processor-readable storage media.

Figure 2B:
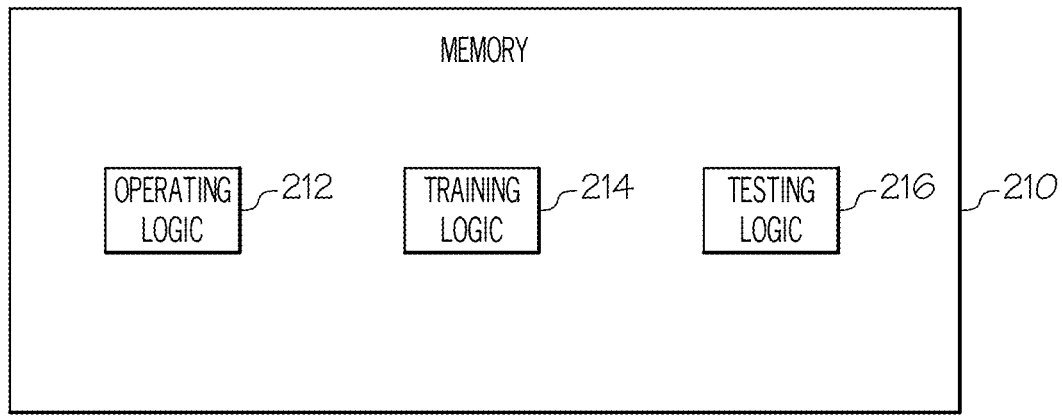
FIG. 2B schematically depicts a block diagram of software modules contained within a memory of a computing device that is used to estimate a pose of a textureless object according to one or more embodiments shown and described herein.

In some embodiments, the program instructions contained on the memory 210 may be embodied as a plurality of software modules, where each module provides programming instructions for completing one or more tasks. For example, as shown in FIG. 2B, the memory 210 may contain operating logic 212, training logic 214, and/or testing logic 216. The operating logic 212 may include an operating system and/or other software for managing components of a computing device. The training logic 214 may include one or more software modules for training a computing device to recognize a pose of one or more textureless objects. The testing logic 216 may include one or more software modules for testing the training of a computing device to verify the accuracy of the training of the computing device, thereby ensuring that the computing device is accurately determining the pose of the textureless object and/or transmitting appropriate commands to the various other components of the computer network 100 (FIG. 1), such as, for example, the robotic device 300.

Referring again to FIG. 2A, a storage device 250, which may generally be a storage medium that is separate from the memory 210, may contain a data repository for storing data that is used for estimating the pose of an object, including training data and/or testing data, as described herein. The storage device 250 may be any physical storage medium, including, but not limited to, a hard disk drive (HDD), memory, removable storage, and/or the like. While the storage device 250 is depicted as a local device, it should be understood that the storage device 250 may be a remote storage device, such as, for example, a server computing device or the like.

Figure 2C:
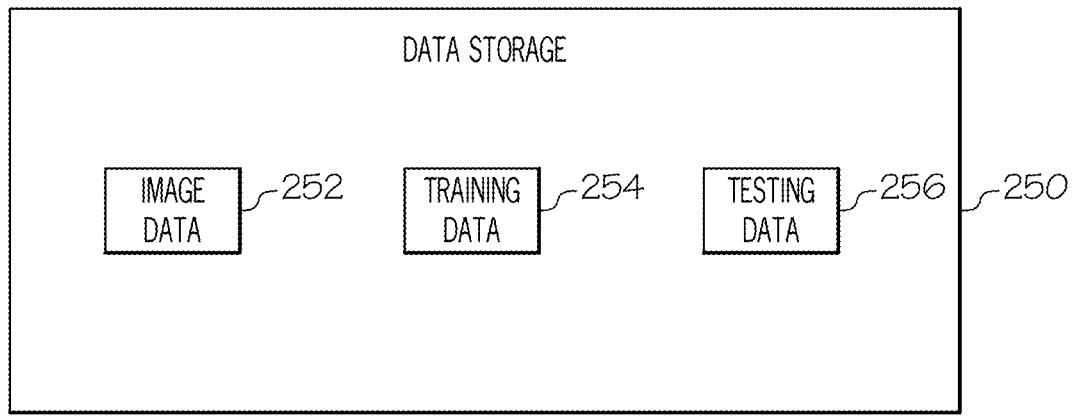
FIG. 2C schematically depicts a block diagram of various data contained within a data storage component of a computing device that is used to estimate a pose of a textureless object according to one or more embodiments shown and described herein.

Illustrative data that may be contained within the storage device 250 is depicted in FIG. 2C. As shown in FIG. 2C, the storage device 250 may include, for example, image data 252, training data 254, and/or testing data 256. Image data 252 may include, for example, sample images of known textureless objects that can be used as a reference in determining the pose of textureless objects, images that are collected of a target textureless object and are subsequently used for determining the pose of the textureless object, and/or the like. Training data 254 may include, for example, data relating to the training of a computing device to recognize the pose of a textureless object, as described in greater detail herein. Testing data 256 may include, for example, data relating to the testing of a computing device in ensuring that the computing device accurately recognizes the pose of a textureless object, as described in greater detail herein.

Referring again to FIG. 2A, an optional user interface 220 may permit information from the bus 201 to be displayed on a display 225 portion of the computing device in audio, visual, graphic, or alphanumeric format. Moreover, the user interface 220 may also include one or more inputs 230 that allow for transmission to and receipt of data from input devices such as a keyboard, a mouse, a joystick, a touch screen, a remote control, a pointing device, a video input device, an audio input device, a haptic feedback device, and/or the like. Such a user interface 220 may be used, for example, to allow a user to interact with the computing device or any component thereof.

A system interface 235 may generally provide the computing device with an ability to interface with one or more of the components of the computer network 100 (FIG. 1), such as, for example, the robotic device 300 and/or the imaging device 305. Communication with such components may occur using various communication ports (not shown). An illustrative communication port may be attached to a communications network, such as the Internet, an intranet, a local network, a direct connection, and/or the like.

A communications interface 245 may generally provide the computing device with an ability to interface with one or more external components, such as, for example, an external computing device, a remote server, and/or the like. Communication with external devices may occur using various communication ports (not shown). An illustrative communication port may be attached to a communications network, such as the Internet, an intranet, a local network, a direct connection, and/or the like.

It should be understood that the components illustrated in FIGS. 2A-2C are merely illustrative and are not intended to limit the scope of this disclosure. More specifically, while the components in FIGS. 2A-2C are illustrated as residing within the server computing device 150 or the user computing device 200, these are nonlimiting examples. In some embodiments, one or more of the components may reside external to the server computing device 150 and/or the user computing device 200. Similarly, one or more of the components may be embodied in other computing devices not specifically described herein.

Figure 3A:
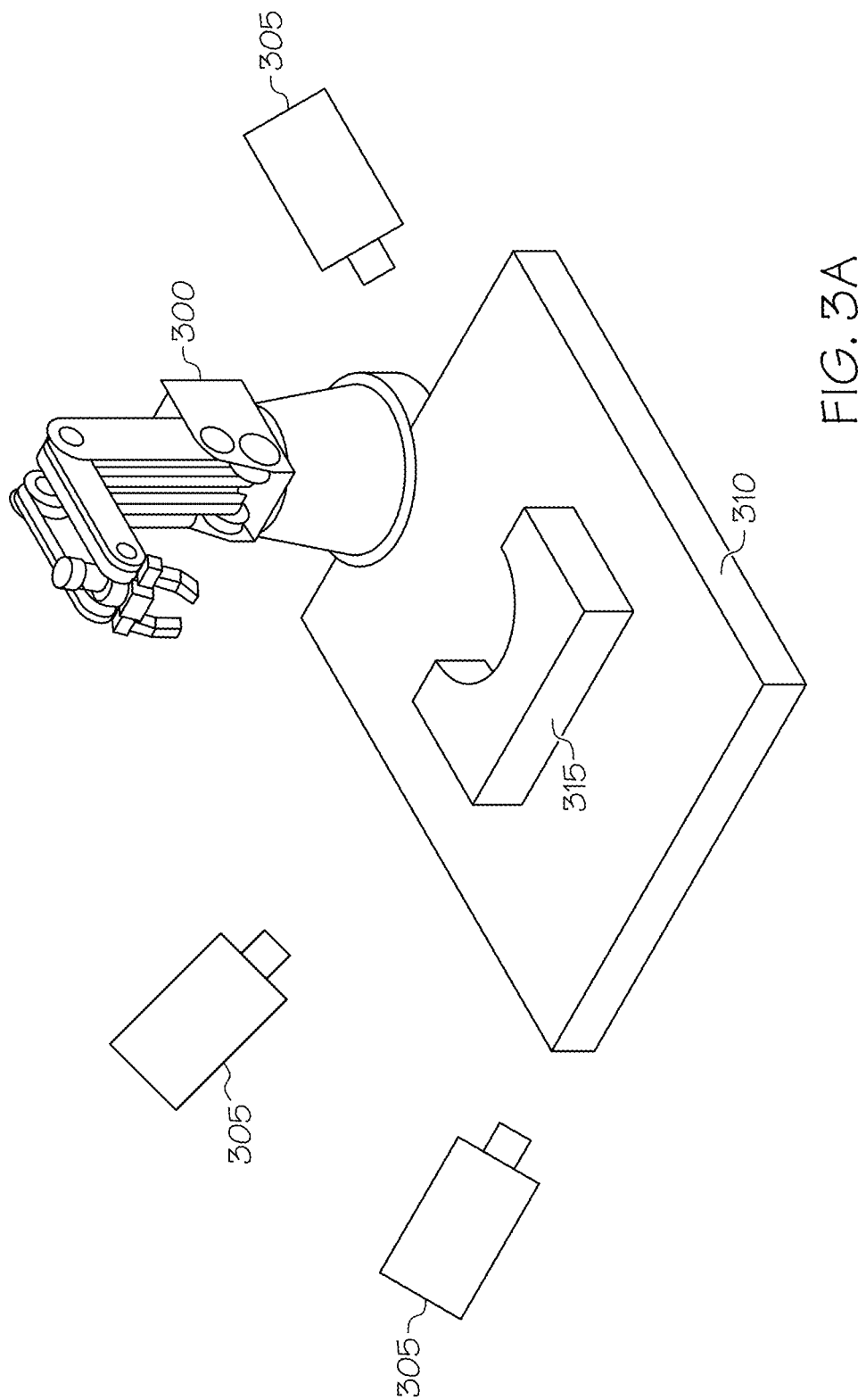
FIG. 3A schematically depicts an illustrative picking surface containing a textureless object according to one or more embodiments shown and described herein.

FIGS. 3A and 3B depict illustrative picking surfaces that support one or more textureless objects. A picking surface 310 may be adjacent to the robotic device 300 such that the robotic device 300 can reach any object located on the picking surface 310. The picking surface 310 may be any surface, such as a work surface or the like. The picking surface 310 may be configured to support placement of one or more textureless objects 315 thereon such that the textureless objects 315 do not fall off of the picking surface 310. Thus, in some embodiments, the picking surface 310 may be horizontal and one or more edges of the picking surface 310 may contain a lip, ridge, wall, or the like that prevents textureless objects 315 from falling off the edge of the picking surface 310. The dimensions of the picking surface 310 are not limited by this disclosure, but may generally be sized and shaped such that at least a portion of the robotic device 300 can reach all portions of the picking surface 310, including each of the one or more edges thereof.

The one or more imaging devices 305 are not limited by this disclosure, and may each generally be any device that captures images. In some embodiments, each of the one or more imaging devices 305 may be a camera, a camcorder, or the like, and may incorporate one or more image sensors, one or more image processors, one or more optical elements, and/or the like. Each of the one or more imaging devices 305 may be capable of zooming in and out and may further be capable of moving, such as, for example, panning, tilting, and/or the like.

The number of imaging devices 305 is not limited by this disclosure and may generally contain any number of imaging devices 305. For example, as shown in FIG. 3A, a plurality of imaging devices 305 may be used to capture the picking surface 310 and/or one or more textureless objects 315 supported thereon. In another example, as shown in FIG. 3B, a single imaging device 305 may be used to capture the picking surface 310 and/or one or more textureless objects 315 supported thereon.

In various embodiments, one or more imaging devices 305 may be positioned adjacent to the picking surface 310. The one or more imaging devices 305 may generally be positioned such that a field of view of each of the one or more imaging devices 305 captures at least a portion of the picking surface 310, including any objects located thereon, such as one or more textureless objects 315. For example, in embodiments where the one or more imaging devices 305 is a plurality of imaging devices (as is shown in FIG. 3A), each of the plurality of imaging devices has its own optical axis. In addition, each individual imaging device is oriented such that each respective optical axis is at a different angle relative to the picking surface 310. In another example, in embodiments where the one or more imaging devices 305 is a single imaging device (as is shown in FIG. 3B), the imaging device may have an optical axis and movement (e.g., rotation) of the imaging device causes the optical axis to continuously reorient at a plurality of different angles relative to the picking surface 310.

The one or more imaging devices 305 may be mounted to any stationary or moving apparatus that provides the imaging device with the capability of imaging the picking surface 310 as described herein. For example, as particularly shown in FIG. 3B, an imaging device 305 may be coupled to an arm or other support (not shown) that allows the imaging device 305 to move about a central axis A around the picking surface 310 (as indicated by the dashed line) such that the imaging device 305 can capture any angle of the picking surface 310. In some embodiments, each of the one or more imaging devices 305 may be configured to track movement of an object, such as one or more textureless objects 315. In some embodiments, movement of each of the one or more imaging devices 305 may be remotely controlled by a user.

Figure 4:
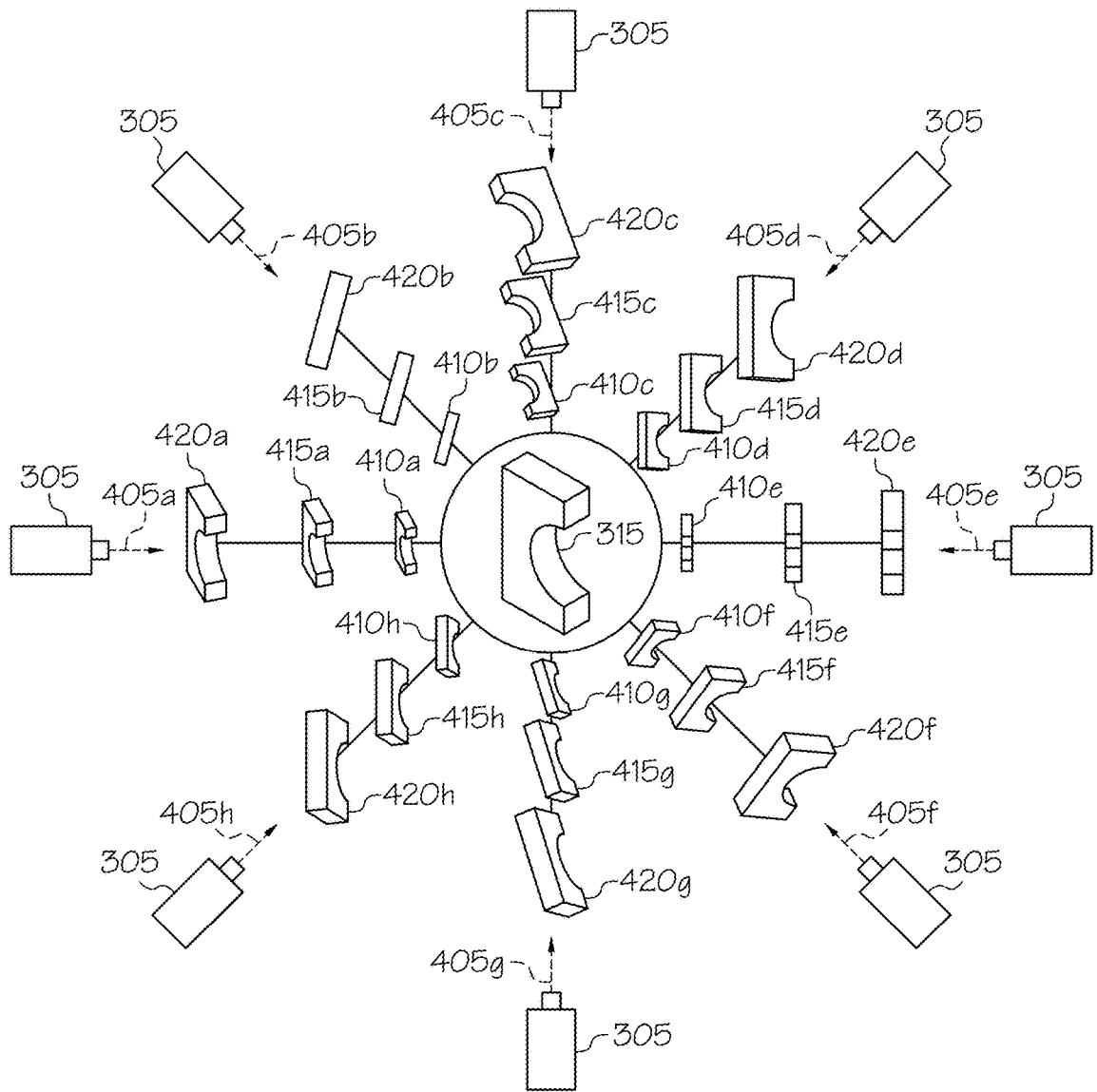
FIG. 4 schematically depicts a plurality of viewpoints and scales of a textureless object as obtained by an imaging device according to one or more embodiments shown and described herein.

Referring now to FIG. 4, the one or more imaging devices 305 may be configured to capture images of a textureless object 315 at a plurality of different viewpoints 405a-405h (collectively 405). The one or more imaging devices 305 may capture images of a textureless object 315 either before it is placed on the picking surface 310 or after it is placed on the picking surface 310. In some embodiments, the various viewpoints 405 may be obtained from a single imaging device 305 that rotates around the textureless object 315 to capture each viewpoint 405a-405h (e.g., as shown in FIG. 3B). In other embodiments, the various viewpoints 405 may be obtained from a plurality of imaging devices 305 positioned around the textureless object to capture each viewpoint 405a-405h (e.g., as shown in FIG. 3A). While FIG. 4 depicts 8 different viewpoints 405, the number of viewpoints 405 is not limited by this disclosure, and may generally be any number of viewpoints sufficient to capture image data and determine the pose of the textureless object, as described in greater detail herein.

In addition to a plurality of viewpoints 405, the one or more imaging devices 305 may also be configured to capture a plurality of scales of the textureless object 315 at each viewpoint 405a-405h. A scale generally refers to a "zoomed in" or "zoomed out" capture of the textureless object 315, provided that the textureless object is wholly visible in each zoom. That is, each scale may represent a particular level of magnification of the captured image at each viewpoint 405a-405h. Various levels of magnification may be obtained using an optical portion of each of the one or more imaging device 305, such as, for example, a zoom lens or the like. For example, the one or more imaging devices 305 may capture, at each viewpoint 405a-405h, a first scale 410a-410h at 1× magnification, a second scale 415a-415h at 2× magnification, and a third scale 420a-420h at 3× magnification. It should be understood that the amount of magnification at each scale described herein is merely illustrative and any magnification can be used without departing from the scope of the present disclosure.

Referring again to FIGS. 3A and 3B, in some embodiments, each of the one or more imaging devices 305 may capture images successively (e.g., "burst mode" capture), may capture single images at particular intervals, and/or may capture motion images (e.g., video capture). In embodiments where images are captured at particular intervals, illustrative intervals may include, but are not limited to, every second, every 2 seconds, every 3 seconds, every 4 seconds, or the like. In some embodiments, each of the one or more imaging devices 305 may capture images whenever directed by a computing device, such as, for example, the server computing device 150 and/or the user computing device 200 depicted in FIG. 1. Image data captured by each of the one or more imaging devices 305 may generally be transmitted to a computing device, such as, for example, the server computing device 150 and/or the user computing device 200 depicted in FIG. 1. The image data may be such that a computing device (e.g., the server computing device 150 and/or the user computing device 200 of FIG. 1) can determine the pose of a textureless object 315 from the images, as described in greater detail herein. In addition, the image data captured by each of the one or more imaging devices 305 may be stored in a storage medium, such as the storage device 250 (FIG. 2A).

The robotic device 300 is not limited by this disclosure and may generally be any robotic device that is capable of and configured to be directed to move, grasp an object, move an object, manipulate an object, and/or the like, such as a robotic picking device or the like. For example, the robotic device 300 may have an arm that is movable in any direction and is also extendible and retractable. In addition, the robotic device 300 may have a hand or the like containing a plurality of fingers that allow the robotic device 300 to grasp an object. Thus, the robotic device 300 may include any number of fixed members, extension members, joints, movable components, and/or the like. The robotic device 300 may also include one or more devices configured to move the robotic device 300, such as a motor, a solenoid, a hydraulic system, a pneumatic system, a piezoelectric system, and/or the like. In some embodiments, the robotic device 300 may include one or more step motors, which may allow for exact movement of the robotic device 300 in particular increments, thereby allowing for precise control of the robotic device 300. In addition, the robotic device 300 may include one or more devices for communication between the various components thereof and/or one or more computing devices, as described in greater detail herein. Such communications devices may receive control signals that direct movement of the robotic device 300 and/or components thereof.

In various embodiments, the robotic device 300 may include one or more sensors attached to a portion thereof, such as, for example, an arm body segment, a robotic hand, a joint, a base portion, and/or the like. The one or more sensors may generally be configured to sense contact between the robotic device 300 and another object. For example, in some embodiments, the one or more sensors may sense contact between the robotic device 300 and the textureless object 315. In particular embodiments, the one or more sensors may be configured to sense an exact location of the contact between the robotic device 300 and the textureless object 315. Such an exact location of contact may provide additional information with regards to the pose of the textureless object 315, as described in greater detail herein. The one or more sensors may generally be any sensor, particularly sensors configured to sense object contact. Thus, in some embodiments, the one or more sensors may include one or more of a touch sensor, an infrared sensor, an optical sensor, a laser sensing device, and/or the like. A touch sensor may generally be a sensor that is configured to sense pressure caused by contact between the robotic device 300 and the textureless object 315. An optical sensor may be an optical diode or the like that is configured to detect the textureless object 315 in its field of view when the textureless object 315 contacts the robotic device 300. In some embodiments, the one or more sensors may be a type of sensor that is commonly used, readily available, and does not require complex components and maintenance.

It should generally be understood that the robotic device 300 depicted in FIGS. 3A and 3B is merely illustrative. Accordingly, the robotic device 300 may include any type of robotic device or similar apparatus without departing from the scope of the present disclosure. Thus, those having ordinary skill in the art will recognize other robotic devices and similar apparatuses that function in a matter similar to the robotic device 300 disclosed herein. Moreover, the present disclosure may also include robotic devices and similar apparatuses containing additional or alternate components and functionality.

In some embodiments, the robotic device 300 and the one or more imaging devices 305 may be integrated into a single component. That is, the robotic device 300 and the imaging devices 305 may constitute a single unit that is used for both imaging the textureless object 315 and for grasping, moving, and manipulating the textureless object 315, as described herein. In other embodiments, the robotic device 300 and the one or more imaging devices 305 may be components that are separate from each other, each having its own distinct functions, as shown in FIGS. 3A and 3B.

The robotic device 300 and the imaging device 305 may generally function in tandem for the purposes of estimating the pose of the textureless object 315 and manipulating the textureless object 315. For example, the imaging device 305 may capture images of the textureless object 315 for a determination of the pose of the textureless object 315 prior to the robotic device 300 manipulating the textureless object 315 (i.e., such that an accurate determination may be made as to positioning of the robotic device 300 prior to manipulation).

In another example, the imaging device 305 may continuously capture images of the textureless object 315 during manipulation thereof by the robotic device 300 such that the textureless object 315 can be monitored for pose to ensure that that the robotic device 300 is not incorrectly manipulating the textureless object 315 and/or to correct the robotic device 300 during manipulation of the textureless object 315.

Figure 5A:
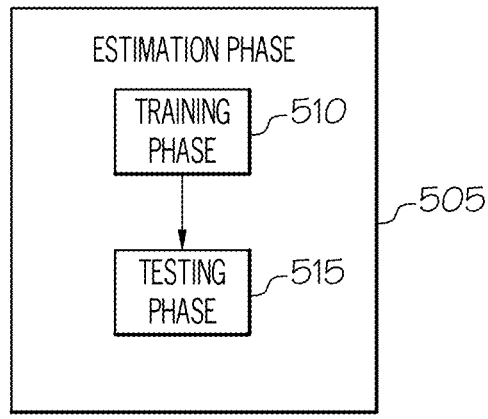
FIG. 5A depicts a high-level flow diagram of an illustrative method of completing a testing phase and a training phase according to one or more embodiments shown and described herein.

As shown in FIG. 5A, a method that may be carried out by a computing device (e.g., the server computing device 150 and/or the user computing device 200 of FIG. 1) may generally include an estimation phase 505 that includes a training phase 510 and a testing phase 515. The estimation phase 505 is generally described herein with respect to FIG. 5B. The training phase is generally described herein with respect to FIG. 6 and the testing phase is generally described herein with respect to FIG. 7. In some embodiments, the training phase 510 may be completed by one or more instructions contained within the training logic 214 (FIG. 2B). In some embodiments, the testing phase 515 may be completed by one or more instructions contained within the testing logic 216 (FIG. 2B).

Figure 5B:
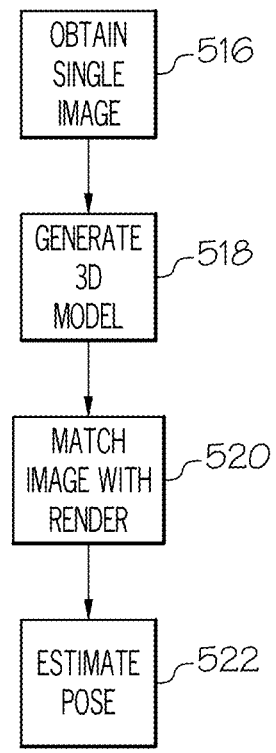
FIG. 5B depicts a flow diagram of an illustrative method of completing an estimation phase according to one or more embodiments shown and described herein.

Referring to FIG. 5B, the estimation phase may include obtaining a single image of a textureless object in step 516. The pose of the textureless object can be inferred from the single image. The single image may be obtained, for example, from the perspective of the robotic device 300 (FIG. 1) such that, when the pose is estimated as described herein, the estimation can be used to transmit instructions to the robotic device 300 for moving to accurately pick up the textureless object, manipulate the textureless object, move the textureless object, and/or the like.

In step 518, a three dimensional (3D) model may be generated (rendered) of the textureless object. Additional detail regarding rendering the three dimensional model will be described herein with respect to FIG. 6 as part of the training phase.

In step 520, the single image obtained in step 516 is matched with a discretized render of the 3D model generated in step 518. Additional detail regarding the three dimensional model will be described herein at least with respect to FIG. 7 as part of the testing phase. As a result of the matching step, an alignment of the single image with the discretized render may be obtained.

From the matching in step 520, the pose of the textureless object is estimated based on the determined alignment, as indicated by step 522. Additional detail regarding the estimation of the pose will be described in greater detail herein.

Figure 6:
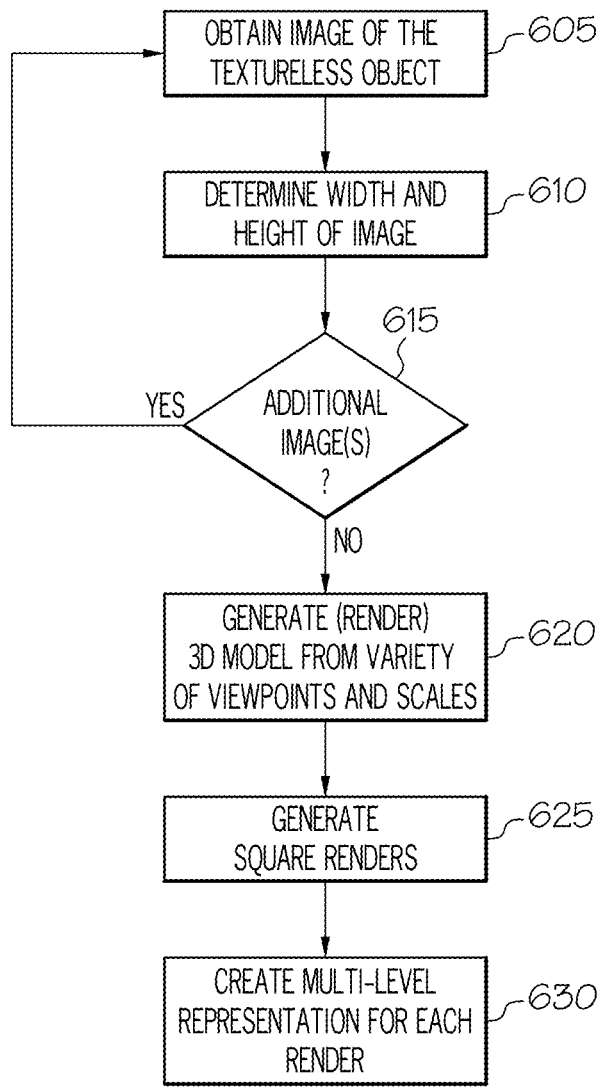
FIG. 6 depicts a flow diagram of an illustrative method of completing a training phase according to one or more embodiments shown and described herein.
Figure 8C:
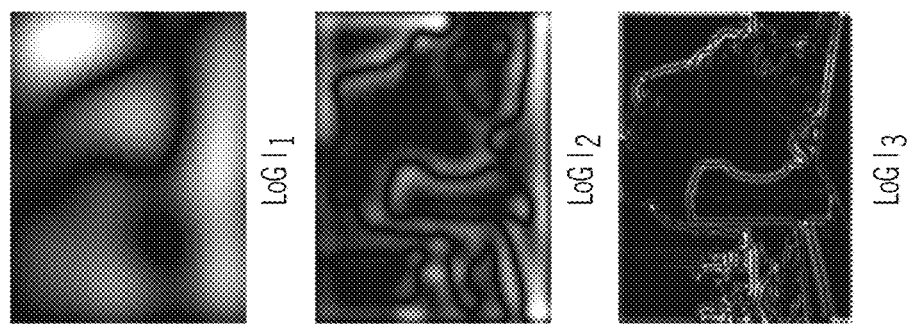
FIG. 8C depicts an illustrative parallel multi-level Laplacian of Gaussian (LoG) representation of an image according to one or more embodiments shown and described herein.

As shown in FIG. 6, in step 605, an image of the textureless object is obtained. The image may generally be obtained from the imaging devices, as described in greater detail herein. In step 610, a width and a height of the textureless object may be determined from the image $I \in R^{w \times h}$, where I represents the image that is obtained, w is the width of the image, and h is the height of the image, as shown in FIG. 8C. In step 615, a determination may be made as to whether additional images of the textureless object exist. For example, as previously described herein with respect to FIG. 4, the one or more imaging devices may capture a plurality of images that represent a plurality of viewpoints $O = \{\Omega_1, \Omega_2, \ldots, \Omega_{N_\Omega}\}$ and/or a plurality of scales $S = \{s_1, s_2, \ldots, s_{N_s}\}$. $N_\Omega$ represents the number of viewpoints and $N_s$ represents the number of scales.

If additional images are to be obtained, the process may return to step 605 to obtain the additional images. Once all of the images have been obtained, a 3D model is generated (rendered) in step 620 by taking all of the images from each of the viewpoints and the scales around the textureless object to obtain n templates. All of the templates may be matched with the image simultaneously by vectorizing the templates and image patches according to Algorithm 1 and Algorithm 2 below. The general purpose of Algorithm 1 and Algorithm 2 is to have a robust similarity measure between a template vector and an image patch vector by transforming the patches $t_i$ and $p_j$ to $t_i'$ and $p_j'$ under a function $f(\cdot)$:

$R^m \leftarrow R^m$, i.e., to compute $t_i' = f(t_i)$ and $p_j' = f(p_j)$. Under this function, the cross-correlation is used as a robust method to measure the similarity of the two vectors (template vector and image vector). The method may generally be robust to different illumination, different model appearance, texture, and slight deformation change if the transformation function $f(\cdot)$ performs the mean-variance normalization of the Laplacian of Gaussian image patch, i.e., if $$f(\cdot) = (f_{mvnorm} \circ f_{LoG})(\cdot) \text{ where} \tag{1}$$

$$f_{mvnorm}(v) = \frac{(v - \mu_v)}{\sigma_v} \tag{2}$$

where $\mu_v$ and $\sigma_v$ are the mean and standard deviation of the intensity values of a vectorized patch $v \in R^m$, and $$f_{LoG}(u) = (\Delta G) * u \tag{3}$$

where u is a patch from the original image, G represents a two-dimensional Gaussian, and $\Delta$ represents the Laplace operator.

The similarity between the transformed patches $t_i'$ and $p_j'$ is represented by:

$$s' = t_i'^T p_j' \tag{4}$$

where s' represents the normalized cross-correlation between the Laplacians of Gaussian of the original patches $T_i$ and $P_j$.

By vectorizing the patches, fast matrix-matrix multiplication on the processing device 205 (FIG. 2A) is leveraged to speed up the computation. A score matrix is developed, S with the size $R^{n \times m}$ where n is the number of templates and m is the number of patches in the image.

$$S = T'P' \tag{5}$$

where $S(i,j)$ represents the correlation value of i-th template $T_i$ with the j-th image patch, T' is the vectorized template matrix, each row of T' represents one vectorize template $t_i'$.

$$T' = \begin{bmatrix} t_1'^T \\ t_2'^T \\ t_n'^T \end{bmatrix} \tag{6}$$

P' is the image matrix, each column of P' represents one vectorized image patch $p_i'$.

$$P' = [p_1', p_2', \ldots, p_N'] \tag{7}$$

To further speed up calculation of Equation (5), a dimensionality reduction on the template matrix T' is pre-computed.

$$T' = AZ \tag{8}$$

where A is an orthogonal matrix and Z is the basis matrix with the first k principal components. To obtain A and Z, the singular value decomposition on T' is completed using principal component analysis (PCA). That is, T' is decomposed as:

$$T' = UDV^T \tag{9}$$

where D represents a diagonal matrix of the same dimension as X, with non-negative diagonal elements in decreasing order, and U, V are diagonal matrices, unitary matrices, respectively. Here, k principal components are selected and a percentage variance is kept:

$$\frac{\sum_{i=1}^{k} D_{ii}}{\sum_{i=1}^{n} D_{ii}} \geq \alpha \quad (10)$$

Where $\alpha=90\%$, the Accuracy is Kept while Reducing the Dimensionality of the Matrix. First k columns are selected from U:

$$A=[U_1,U_2,\ldots,U_k] \quad (11)$$

and define Z as:

$$Z = \begin{bmatrix} D_{11} & \cdots & 0 \\ \vdots & \ddots & \vdots \\ 0 & \cdots & D_{kk} \end{bmatrix} \begin{bmatrix} V_{11} & \cdots & V_{mk} \\ \vdots & \ddots & \vdots \\ V_{m1} & \cdots & V_{mk} \end{bmatrix}^T \quad (12)$$

from S=T'P' and T'=AZ, the following is obtained:

$$S=AQ \quad (13)$$

where $$Q=ZP \quad (14)$$

Rather than directly calculating Equation (13), the calculation of AQ is sped up by first eliminating image locations where a high score is unlikely. Specifically, columns in Q are eliminated and get Q'=[ ... $Q_i$ ... ], i∈I, where I is a small subset of index into the image matrix columns corresponding to the probable image location. The final score matrix S' is obtained as:

$$S'=AQ' \quad (15)$$

The $L_2$ norm of each column in matrix Q is used (i.e., $\|Q_j\|$) as a measurement. If $\|Q_j\|$ is bounded above by $\lambda$, that is, all templates score at this pixel is below $\lambda$. This observation allows for elimination of unlikely image patches corresponding to j-th column in Q.

| Algorithm 1: Offline Template Matrix Generation and PCA |
|---|
| Input: |
| all templates $T_1...T_n$ |
| Output: |
|     coefficient matrix A, basis matrix Z |
| 1:    for all Template $T_i$ do |
| 2:        LoG ($T_i$) with CUDA parallel threads; |
| 3:        mean normalize $T_i$ with CUDA parallel threads; |
| 4:        transform $T_i$ to one column in the image matrix $T_I'$; |
| 5:    end for |
| 6:    A, Z ⇐ PCA($T_I'$) |

| Algorithm 2: Online massive template matching |
|---|
| Input: |
| template coefficient matrix A, basis matrix Z, threshold $\lambda$ |
| Output: |
|     Score matrix S for each frame |
| 1:    for each new frame I do |
| 2:        LoG (I) with CUDA parallel threads; |
| 3:        call one parallel thread each image patch $P_j$; |
| 4:        for all CIDA threads do |
| 5:            mean normalize $P_j$; |
| 6:            transform $P_j$ to one column in the image matrix $P_j'$; |
| 7:        end for |

-continued

| Algorithm 2: Online massive template matching |
|---|
| 8:        compute Q ⇐ ZP' with CUDA parallel threads; |
| 9:        m ⇐ 1; |
| 10:       for j = 1 to N do |
| 11:            if $\|Q_j\| > \lambda$ then |
| 12:                $Q_m' \Leftarrow Q_j$; |
| 13:                m ⇐ m + 1 |
| 14:            end if |
| 15:       end for |
| 16:       S ⇐ AQ' |
| 17:    end for |

For example, if a template $T_i \in R^{w' \times h'}$, here i∈{1, 2, ..., n}, and n is the number of templates, w' and h' are respectively the width and height of the template. The template is vectorized specifically to put the row-order pixels sequentially into a column vector $T_i \in R^N$, N is the pixel number in one template. Similarly, if an image patch $P_j$ with the same size of the template at location j in the image I∈$R^m$, where j∈{1, 2, ..., m}, and m represents the number of image patches in I. The patch is vectorized into a vector $p_j \in R^m$. The cross-correlation between the two vectors, $t_i$ and $p_j$, represents the similarity between the i-th template $T_i$ and the j-th image patch $P_j$.

Figure 8B:
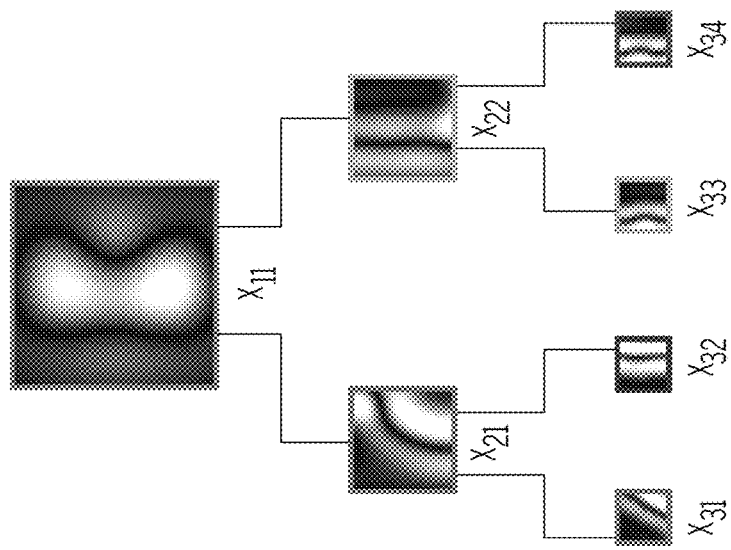
FIG. 8B depicts an illustrative plurality of extracted patches of varying sizes from the Laplacian of Gaussian (LoG) representation centered at various point locations according to one or more embodiments shown and described herein.
Figure 8A:
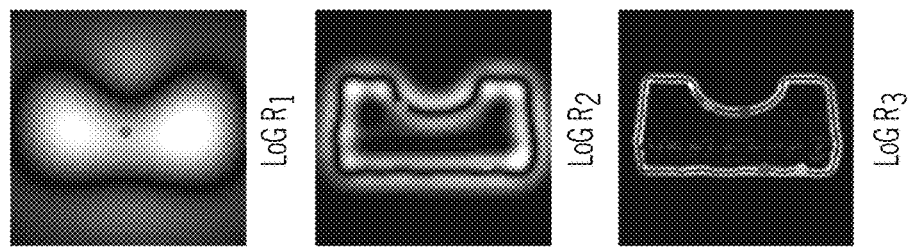
FIG. 8A depicts an illustrative multi-level Laplacian of Gaussian (LoG) representation of a captured image at various standard deviations according to one or more embodiments shown and described herein.

At step 625, square renders are generated of width U, where U∝s, and s∈$\mathcal{S}$. The render from viewpoint Ω∈$\mathcal{O}$ and scale s∈$\mathcal{S}$ is represented by R∈$\mathbb{R}^{U \times U}$. For each render R, a multi-level representation is created in step 630 by convolving R with Laplacian of Gaussian (LoG) kernels of decreasing standard deviations $\sigma_1, \sigma_2, \ldots, \sigma_L$ to yield a set of LoG images $\mathcal{R}=\{R_1, R_2, \ldots, R_L\}$ where L is the number of levels in the multi-level representation. At a topmost level (i.e., at $R_1$), the LoG contains coarse blobs representing various consistent regions in an image, and provides distinctiveness. At a bottommost level (i.e., at $R_L$), the LoG represents fine-scale details of corners and texture, and offers precision, but not distinctiveness. For example, as depicted in FIG. 8A, $R_L$ contains several precise edge features.

Figure 7:
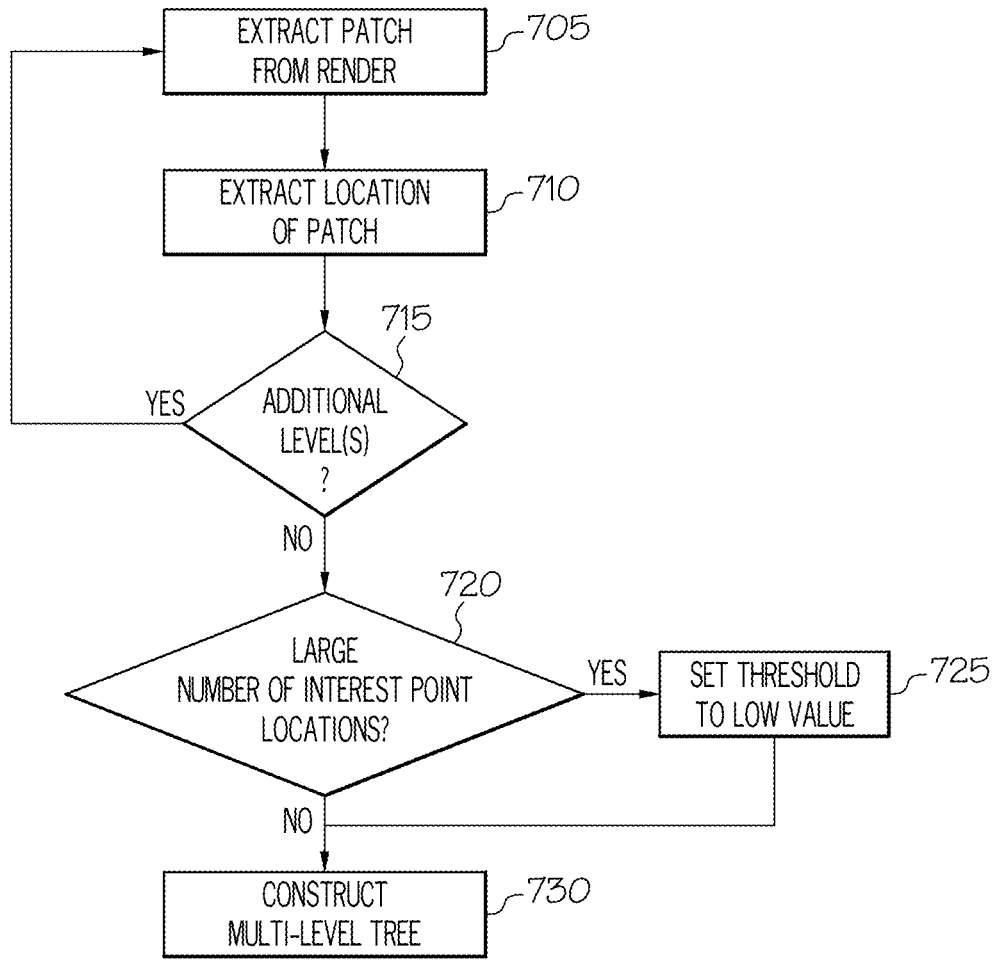
FIG. 7 depicts a flow diagram of an illustrative method of completing a testing phase according to one or more embodiments shown and described herein.

Referring now to FIG. 7, the testing phase may include a process for forming a multi-level tree for patch localization. In step 705, a patch is extracted from each render R, and in step 710 a location of each patch is extracted. Thus, for each level l, l∈{1, 2, ..., L}, $N_l$ patches $R_l(y_{il}) \in \mathbb{R}^{U \times U_l}$ are extracted from locations $y_{il} \in \mathbb{R}^2$ in the LoG $R_l$ render at level l. Here, l∈1, 2, ..., $N_l$, and $U_l=2\lceil 3\sigma_l \rceil+1$. The locations $y_{il}$ are extracted by running an interest point extraction algorithm underlying Scale Invariant Feature Transform (SIFT) on the multi-level Laplacian of Gaussian representation. In step 715, a determination is made as to whether additional levels exist, and if so, the process returns to step 705.

In step 720, a determination is made as to whether a large number of interest point locations per level is to be extracted, and if so, a cornerness threshold is set to a low value at step 725. For example, in some embodiments, the cornerness threshold may be 0.02. The objective is to simultaneously estimate the locations of all patches in the multi-level representation of I (i.e., in the set I). The location of a patch $R_l(y_{il})$ is represented in the LoG $I_l$ at level l as the random variable $x_{il}$. The sample space of each $x_{il}$ is the discrete two-dimensional grid $\mathbb{R}^{w \times H}$ representing the domain of the image I. The objective corresponds to computing the maximum of the joint probability $p(x_{11}, x_{12}, \ldots x_{N_l l}|I)$ of the locations $x_{11}, x_{12}, \ldots x_{N_l l}$ given the set I of LoGs for I, i.e., $$\max_{x_{11}, x_{12}, \ldots, x_{N_L l}} p(x_{11}, x_{12}, \ldots, x_{N_L l} | I) \quad (16)$$

The optimization of the joint probability in Equation (16) is computationally intractable. To determine the best localizations of all patches in the image, $$(WH)^{\sum_{l=1}^{L} N_l}$$

hypotheses must be evaluated. To tractably search the space of possible patch locations, a multi-level tree is constructed by linking each high-level patch to several low-level patches, as shown in FIG. 8B. Using Bayes rule and the rules of conditional independence, the joint probability $p(x_{11}, x_{21}, x_{22}, x_{31}, x_{32}, x_{33}, x_{34} | I)$ is expressed as products of conditional probabilities of the locations of lower-level patches given higher-level patches, i.e., as $$p(x_{11}, x_{21}, x_{22}, x_{31}, x_{32}, x_{33}, x_{34} | I) = p(x_{11} | I) p(x_{21} | x_{11}, I)$$
$$p(x_{31} | x_{21}, I) p(x_{32} | x_{21}, I) p(x_{22} | x_{11}, I) p(x_{33} | x_{22}, I)$$
$$p(x_{34} | x_{22}, I) \quad (17)$$

The max-product rule is used to break down the maximization of the probability in Equation (17) as $$\max_{x_{11}} \begin{pmatrix} p(x_{11} | I) \max_{x_{21}} (p(x_{21} | x_{11}, I)) \max_{x_{31}} (p(x_{31} | x_{21}, I)) \\ \max_{x_{32}} (p(x_{32} | x_{21}, I)) \max_{x_{22}} (p(x_{22} | x_{11}, I)) \\ \max_{x_{33}} (p(x_{33} | x_{22}, I)) \max_{x_{34}} (p(x_{34} | x_{22}, I)) \end{pmatrix} \quad (18)$$

Equation (18) allows for leveraging dynamic programming to perform exact inference over the tree structure shown in FIG. 8B.

For purposes of simplicity, the description below relates to obtaining the conditional probability $p(x_{21} | x_{11}, I)$ of the child $x_{21}$ given its parent $x_{11}$. However, it should be understood that the description below applied to all patches. Bayes rule is used to express the $p(x_{21} | x_{11}, I)$ as $$p(x_{21} | x_{11}, I) = p(I | x_{21}, x_{11}) p(x_{21} | x_{11}) / Z \quad (19)$$

In Equation (19), $p(x_{21} | x_{11})$ represents the prior probability of knowing the location $x_{21}$ of the child patch given the location $x_{11}$ of its parent, and $p(I | x_{21}, x_{11})$ represents the data likelihood. The term Z in Equation (19) represents the evidence that ordinarily forces $\Sigma_{x_{21}} p(x_{21} | x_{11}, I)$ to equal 1. Numerically stable results are obtained by setting Z to 1, as otherwise it introduces division by small values and yields spurious responses in $p(x_{21} | x_{11}, I)$.

The term $p(x_{21} | x_{11})$ in Equation (19) represents the prior probability of knowing the location of $x_{21}$ of the child patch given the location $x_{11}$ of its parent. The 3D model render is used to provide the prior that the displacement between $x_{21}$ and $x_{11}$ in the image should be similar to the displacement between $y_{21}$ and $y_{11}$ in the render. The displacement similarity is modeled as a Gaussian prior $p(x_{21} | x_{11})$, where $$p(x_{21} | x_{11}) = T^{-1} \exp(-\lambda_2^{-2} \| x_{11} + \Delta y_{21} \|^2) \quad (20)$$

$T = \Sigma_{x_{21}} \exp(-\lambda_2^{-2} \| x_{11} + \Delta y_{21} \|^2)$, $\Delta y_{21} = y_{21} - y_{11}$, and $y_{21}$ and $y_{11}$ are the locations of the child patch and parent patch in the render. In Equation (20), the standard deviation $\lambda_2$ (or in general $\lambda_l$) represents the extent to which the patch can jitter within the LoG $I_3$ (or, in general in $I_l$). At the bottommost level, i.e., at level L, the patch may be set to the standard deviation $\sigma_L$ of the LoG kernel at L, to allow the patch to jitter within the region corresponding to the size of its parent patch. For all other levels, $\lambda_l$ is set to 2 to reflect the decrease in patch size by powers of 2.

In Equation (19), $p(I | x_{21}, x_{11})$ represents the data likelihood of finding the location $x_{21}$ of the patch $R_2(y_{21})$ in the image. The LoG images are assumed to be generated by the patches independently, yielding $$p(I | x_{21}, x_{11}) = p(I_1 | x_{21}, x_{11}) p(I_2 | x_{21}, x_{11}) p(I_3 | x_{21}, x_{11}) \quad (21)$$

It is further assumed that the likelihood of generating LoG s at the level of child $x_{21}$ is independent of its parent $x_{11}$, allowing for the dependence on $x_{11}$ in Equation (21) to be discarded. In addition, it is assumed that each non-leaf patch location (i.e., $x_{21}$, $x_{22}$, and $x_{11}$) depends only on itself and on its children, allowing for the first multiplicative term in Equation (21) to be discarded. This assumption simplifies the data likelihood to $$p(I | x_{21}, x_{11}) = p(I_2 | x_{21}, x_{11}) p(I_3 | x_{21}, x_{11}) \quad (22)$$

Suppose $I_2(x_{21})$ represents a patch of size $U_2 \times U_2$ extracted from the LoG of the image $I_2$ at location $x_{21}$, and a represents the patch vectorized as a column vector. Let $R_2(y_{21})$ similarly represent the patch of size $U_2 \times U_2$ extracted from the LoG $R_2$ of the render at location $y_{21}$, and let b represent the patch vectorized as a column vector. $P(I_2 | x_{21})$ is modeled (i.e., the contribution of the patch $R_2(y_{21})$ in generating $I_2 | x_{21}$)) as $$p(I_2 | x_{21}) = \exp\left(\beta \left| \frac{(a - \mu_a)^T (b - \mu_b)}{U_2^2 \sigma_a \sigma_b} \right| - \beta \right) \quad (23)$$

Figure 9:
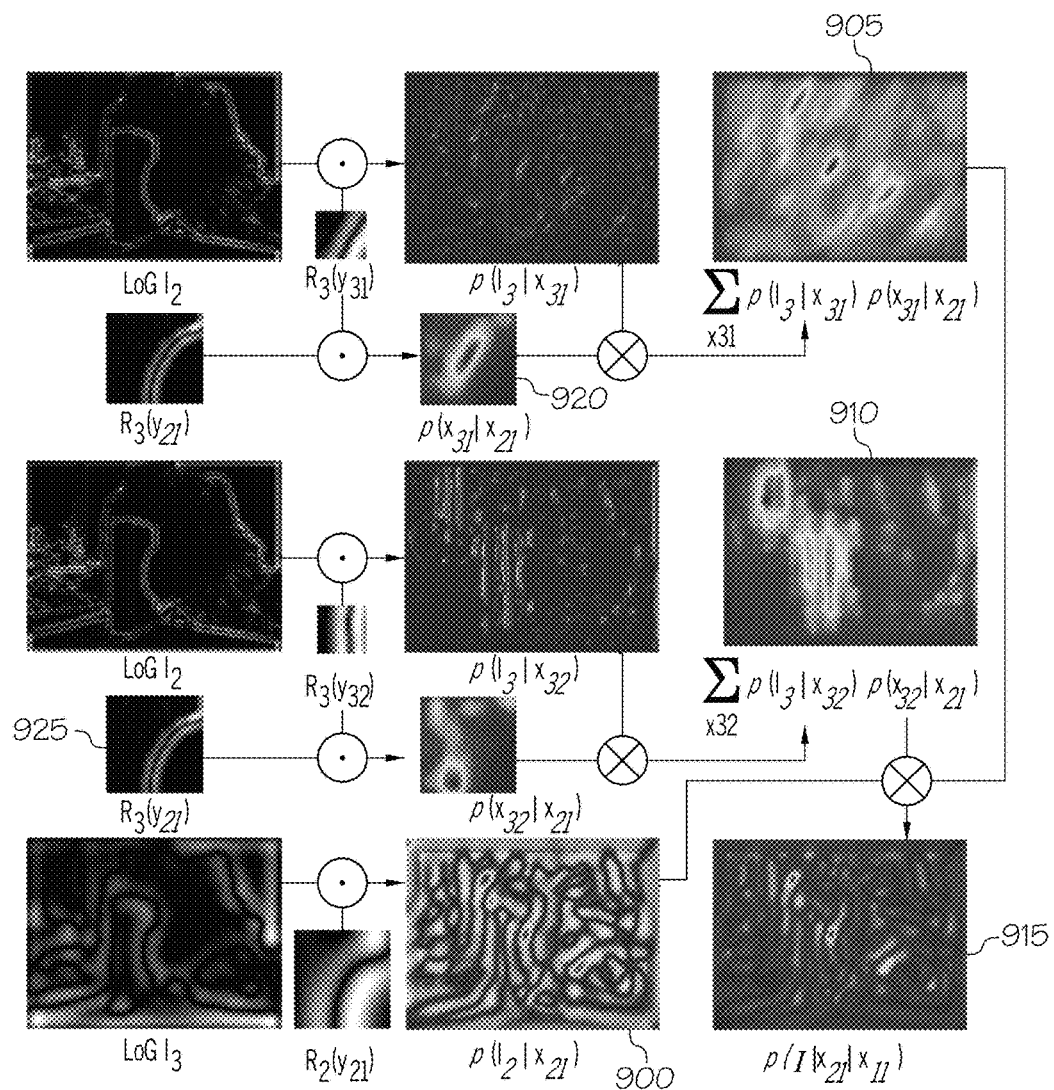
FIG. 9 depicts a plurality of illustrative maps according to one or more embodiments shown and described herein.

The map 900 located at the bottom of the middle column in FIG. 9 represents $p(I_2 | x_{21})$. The term in the absolute value in Equation (23) is the normalized cross-correlation of the patch $R_2(y_{21})$ with the patch $I_2(x_{21})$ from the LoG of the image. In Equation (23), $\mu_a$ and $\mu_b$ are the mean intensities in the patch $I_2(x_{21})$ and the patch $R_2(y_{21})$ respectively, while $\sigma_a$ and $\sigma_b$ are the standard deviations in their intensities. The normalized cross-correlation provides illumination-invariance between features in the patches that represent similar features in the image. To speed up the matching, fast normalized cross-correlation of $R_2(y_{21})$ is performed with the entire LoG $I_2$ using Fourier transforms and integral sums. The absolute value of the normalized cross-correlation is taken to account for contrast reversal. The parameter $\beta$ represents the peakiness of the probability distribution, which may be set to 4, for example.

The term $p(I_3 | x_{21})$, i.e., the contribution of the patch at position $x_{21}$ can be modeled by marginalizing the data likelihoods of the children of the patch corresponding to $x_{21}$ by showing that:

$$p(I_3 | x_{21}) = (\Sigma_{x_{31}} p(I_3 | x_{31}) p(x_{31} | x_{21}) \Sigma_{x_{32}} p(I_3 | x_{32})$$
$$p(x_{32} | x_{21}))^{1/2} \quad (24)$$

The top two maps 905, 910 in the right column of FIG. 9 represent the marginalizations in Equation (24). Replacing Equation (24) into Equation (22) the data likelihood $p(I | x_{21}, x_{11})$ is written as:

$$p(I | x_{21}, x_{11}) = p(I_2 | x_{21}) (\Sigma_{x_{31}} p(I_3 | x_{31}) p(x_{31} | x_{21})$$
$$\Sigma_{x_{32}} p(I_3 | x_{32}) p(x_{32} | x_{21}))^{1/2} \quad (25)$$

The bottom right map 915 in FIG. 9 represents $p(I | x_{21}, x_{11})$. Equation (25) allows for modeling the data likelihood of a patch as having contributions from itself and from its children, thus strengthening the response of the patch. In this respect, such an approach is distinct from other approaches where the data likelihood of parent parts is modeled distinctly from the children parts. To emphasize leaf patches in contributing toward the joint probability in Equation (16), the square root of the right hand side of Equation (25) is used for non-leaf patches such as $x_{21}$ to represent the data likelihood $p(I|x_{21},x_{11})$.

The term $p(x_{31}|x_{21})$ in Equation (16), shown in map 920 in FIG. 9 is distinct from the similar term $p(x_{21}|x_{11})$ in Equation (19). Here, it is used to model a prior over the expected appearance of the patch at location $x_{21}$ in the image due to its children. The appearance prior represents the notion that on average the response of the image due to a patch, i.e., the response represented by $p(I_3|x_{31})$, should be similar to the response of the render due to the patch, as a render from the correct viewpoint provides a reasonable initializer for the illumination-invariant appearance of the object. To model $p(x_{31}|x_{21})$, patch $R_3(y_{21}) \in \mathbb{R}^{U_2 \times U_2}$ is extracted at the location of the parent $y_{21}$ from the LoG $R_3$. $R_3(y_{21})$ is shown in map 925 of FIG. 9. Let $R_3(y_{31}, y_{21})$ represent a patch of size $\mathbb{R}^{U_2 \times U_2}$ extracted from $R_3(y_{21})$ at the location of each child patch $y_{31}$. Also, let $R_3(y_{31})$ represent the child patch extracted from $R_3$ at location $y_{31}$. If a and b respectively represent $R_3(y_{31}, y_{21})$ and $R_3(y_{31})$ vectorized, $p(x_{31}|x_{21})$ can be written similar to Equation (23), i.e., as:

$$p(x_{31}|x_{21}) = Q^{-1} \exp\left(\beta \left| \frac{(a-\mu_a)^T(b-\mu_b)}{U_3^2 \sigma_a \sigma_b} \right| - \beta \right) \quad (26)$$

where $$Q = \Sigma_{x_{31}} \exp\left(\beta \left| \frac{(a-\mu_a)^T(b-\mu_b)}{U_3^2 \sigma_a \sigma_b} \right| - \beta \right).$$

As in Equation (23), the term in the absolute value in Equation (26) represents the normalized cross-correlation between the patch $R_3(y_{31})$ and the patch $R_3(y_{31}, y_{21})$. Since Equation (26) does not depend on the image, $p(x_{31}|x_{21})$ is built and stored prior to the test phase. In practice, the marginalization $\Sigma_{x_{32}} p(I_3|x_{32}) \beta(x_{32}|x_{21})$ is performed by convolving the map of the likelihood $p(I_3|x_{32})$ over the entire image with the map of the prior probability in appearance $p(x_{32}|x_{21})$ in the Fourier domain.

Figure 10:
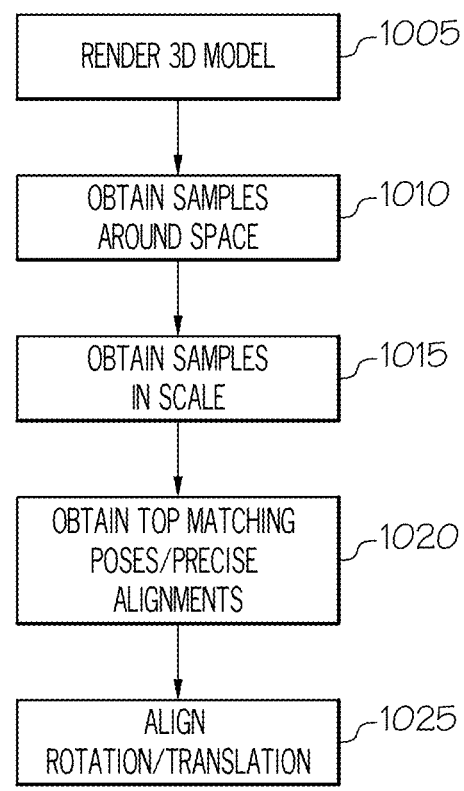
FIG. 10 depicts a flow diagram of an illustrative method of providing coarse-to-fine alignment according to one or more embodiments shown and described herein.

To provide precise alignment with fast exhaustive search, a coarse-to-fine alignment approach is provided, as shown in FIG. 10. In step 1005, the 3D model is rendered over a plurality of orientations and over a plurality of scales to yield a plurality of square template renders. In a nonlimiting example, the 3D model may be rendered over 324 orientations (36 samples in azimuth spaced 10°, 3 samples in elevation spaced 20° apart, and 3 sampled in in-plane rotations spaces 20° apart). In another nonlimiting example, the 3D model may be rendered over 16 scales. As a result, 5184 square template renders of width U=180 may be yielded. The $s^{th}$ scale may be set, for example, as $(0.75 + 0.05(s-1))^{-1}$. A one-level tree (L−1) with $\sigma_1 = 3$ to select a set of candidates from the templates. In a nonlimiting example, 20 candidates may be selected from 5184 templates.

In step 1010, a plurality of fine samples in viewpoint around the space of each of the candidates with elevation offsets, azimuth offsets, and/or in-plane offsets are obtained. In a nonlimiting example, 5 fine samples may be obtained around the space of each of 20 candidates, with elevation offsets 5°, 0°, 0°, 0°, and −5°, azimuth offsets, 0°, 5°, 0°, −5°, and, 0°, 0°, 0°, and −5°, and no in-plane offsets. In step 1015, a plurality of samples may be obtained in scale to yield a plurality of templates. In a nonlimiting example, 5 samples may be obtained in scale, yielding 5000 templates.

The multi-level alignment approach may be used to obtain a plurality of best matching poses along with the precise alignments of the patches from each best matching pose in step 1020. In a nonlimiting example, the multi-level alignment approach may be used with L=5 to obtain the top five best matching poses.

In step 1025, Random sample consensus (RANSAC) may be used to align the rotation R and its translation t of the 3D model to the matched image locations. Within each RANSAC iteration, an efficient Perspective-n-Point (PnP) algorithm may be used with a plurality of correspondences. In a nonlimiting example, the efficient PnP algorithm may be used with n=4 correspondences. Focal length is assumed to be provided by exchangeable image file (EXIF) tags or through camera calibration (i.e., data sent from imaging device 305 of FIG. 1). To account for differences between the 3D model geometry from the original image, a final non-rigid deformation of the 3D model may be provided to precisely match the point locations by minimizing the objective function:

$$\sum_{l=1}^{L} \sum_{i=1}^{N_l} \|(x_{il} K_3 - K_{1:2})(R X_{il} + \Delta X_{il} + t)\|^2 + \quad (27)$$

$$\lambda \sum_{j=1}^{N_{model}} \left\| \Delta X_j - \sum_{k \in \mathcal{N}_j} \frac{\Delta X_k}{d_j} \right\|^2 + \gamma \sum_{j=1}^{N_{model}} \|\Delta X_j\|^2$$

in the deformation $\Delta X$. In Equation (27), the first squared term represents the DLT-linearized reconstruction error of the projection of the 2D model X oriented using R and t and augmented with deformation $\Delta X$ from the estimated patch locations $x_{il}$. The second term, similar to one used in Laplacian surface editing, constrains the 3D model mesh to be smooth by ensuring that all k vertices in the 1-ring $\mathcal{N}_j$ of the $j^{th}$ vertex have similar deformation as the $j^{th}$ vertex. The third term constrains the deformation to be small. $N_{model}$ represents the number of points on the 3D model, $K_{1:2} \in \mathbb{R}^{2 \times 3}$ represents the matrix of the first two rows of the intrinsic parameters matrix and $K_3$ is a row-vector corresponding to the third row of the intrinsic parameters matrix. In some embodiments, the smoothness weight $\lambda$ may be set to 0.1 and the shrinkage parameter $\gamma$ may be set to 0.005.

As a result of the above, the pose of the textureless object should be sufficient that the robotic device 300 (FIG. 1) can be directed to move to a particular position such that the location and positioning of the robotic device 300 is sufficient to appropriately grasp the textureless object, move the textureless object, and manipulate the textureless object. By estimating the pose as described herein, issues involving an improper grasp, dropping the textureless object, and/or the like are avoided or minimized.

EXAMPLES

Example 1

Testing

A plurality of textureless objects were placed in an area to be imaged by an imaging sensor. The textureless objects include a wooden bridge, a cup, a mug, a wooden car, a toy pumpkin, a teapot, a coffee creamer can, and a stuffed toy bird. The imaging sensor was an RGB camera that captures images of size 640×480 for each object from a variety of viewpoints. The images were then downsampled to 320×240. Autodesk 123D Catch (Autodesk Inc., San Rafael, Calif.) was used to build a 3D model for all of the objects except for the mug by capturing 30 to 50 photographs of resolution 3648×2048 for each object using a second imaging device. The bridge, car, pumpkin, and bird objects had sufficient fine grained texture to find correspondences within the high resolution photographs in Autodesk 123D Catch. For smooth objects such as the cup and teapot, markers were applied over sticky tape on the objects, and the tape was removed after building the 3D model. For the mug, a 3D model obtained from an online model repository was used.

Figure 11:
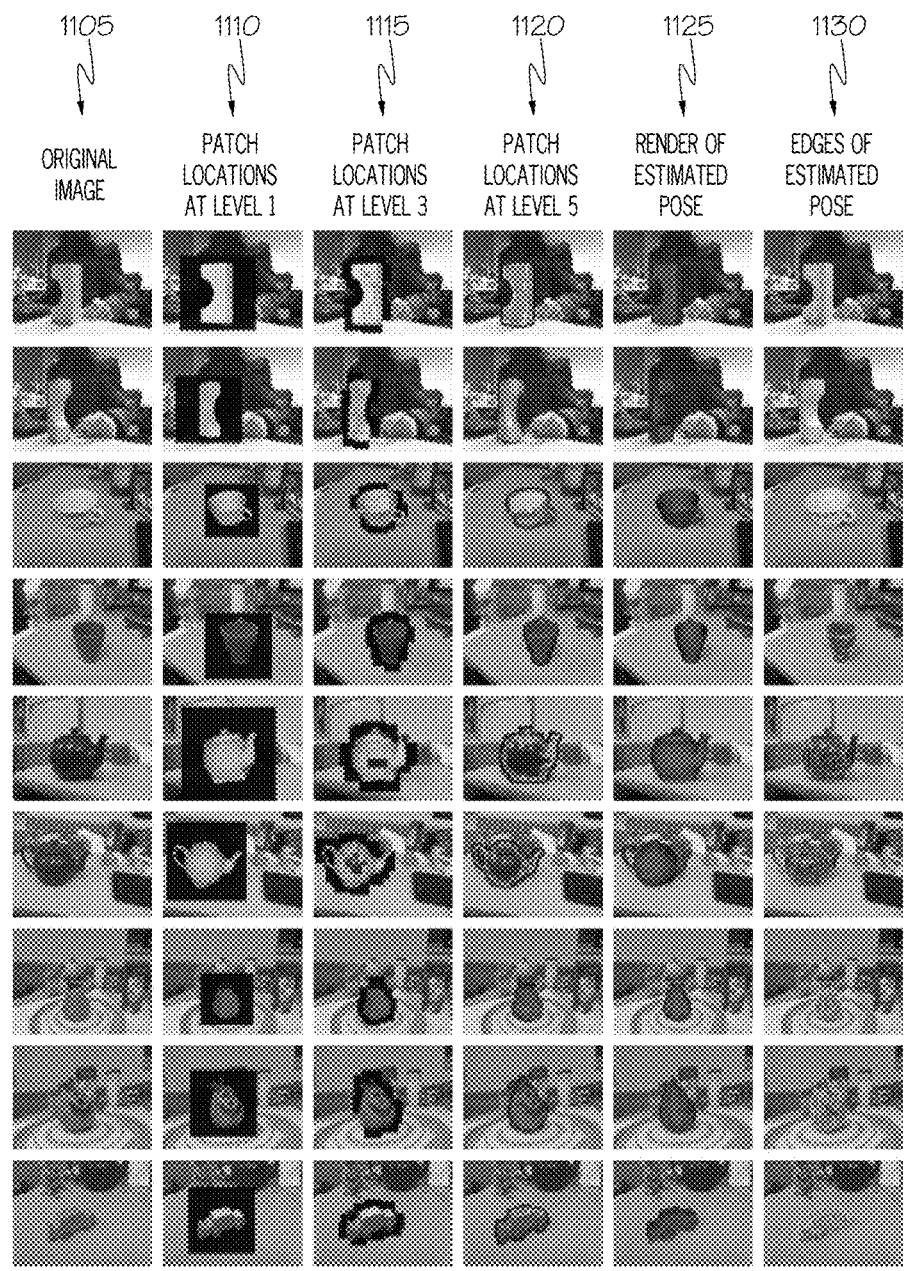
FIG. 11 depicts a plurality of illustrative alignments of 3D models for images of objects according to one or more embodiments shown and described herein.

FIG. 11 depicts the top 3D alignment of the objects to the input images captured using the imaging sensor. Particularly, FIG. 11 shows the original input images 1105, the patches localized at level 1 of the 5-level tree 1110, the patches localized at level 3 of the 5-level tree 1115, the patches localized at level 5 of the 5-level tree 1120, a render of the estimated pose in place of the original object pixels 1125, and an edge representation of the estimated pose render superimposed over the image 1130. The patch at level 1 of the 5-level tree 1110 represents the best matching render. Tables 1 and 2 below show mean squared rotation and translation errors per object. The second row represents the error of the most accurate match from the top five results. Providing the top five matches reduces the error by about 26% on average.

TABLE 1

Mean Squared Rotation Errors per Object

| 0 | Cup | Bridge | Pumpkin | Car | Teapot | Can | Bird | Mug |
|---|------|--------|---------|------|--------|------|------|------|
| Top 1 | 0.60 | 0.56 | 0.72 | 1.20 | 0.65 | 1.25 | 0.51 | 1.27 |
| Top 5 | 0.28 | 0.28 | 0.63 | 0.83 | 0.50 | 1.15 | 0.40 | 0.86 |
| Existing | 1.22 | 0.73 | 0.47 | 0.33 | 1.87 | 1.64 | 0.49 | 1.78 |

TABLE 2

Mean Squared Translation Errors per Object

| 0 | Cup | Bridge | Pumpkin | Car | Teapot | Can | Bird | Mug |
|---|------|--------|---------|------|--------|------|------|------|
| Top 1 | 1.45 | 0.85 | 1.32 | 6.84 | 2.76 | 11.27 | 3.87 | 2.52 |
| Top 5 | 1.10 | 0.36 | 0.78 | 5.36 | 1.03 | 10.30 | 2.61 | 1.01 |

The rotation accuracy was compared to an existing method in which the approach provides the nearest matching render, which is used to infer the nearest rotation. However the existing method does not provide 3D translation. Lower mean squared errors over the existing method were found for all objects except the car and the pumpkin. Since the car is rectilinear, front and back views of the car share several edge orientation with non-car objects or with side views of the car.

Figure 12:
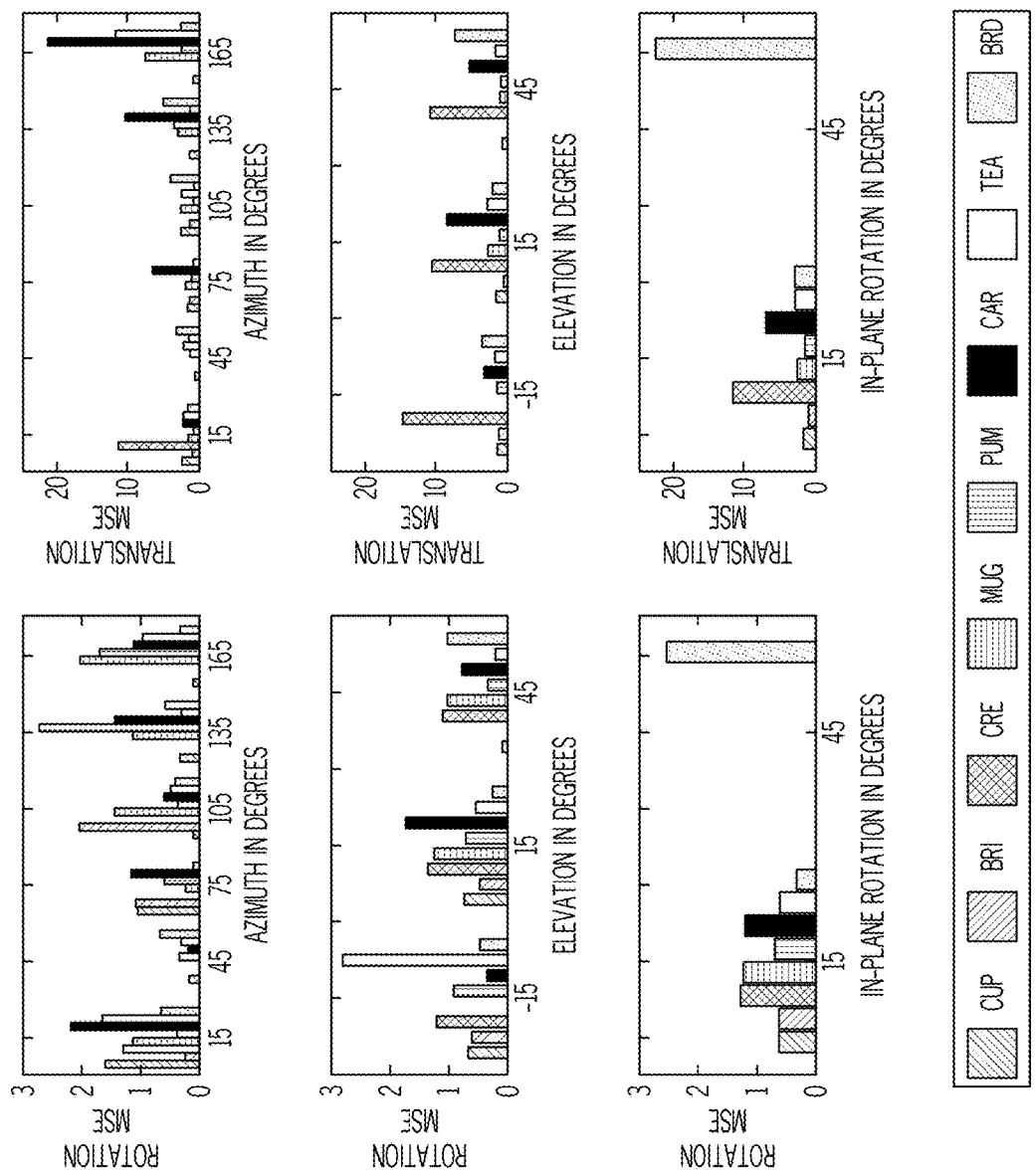
FIG. 12 depicts a histogram of an illustrative mean squared error (MSE) in rotation and translation per object versus azimuth, elevation and in-plane rotations according to one or more embodiments shown and described herein.

FIG. 12 depicts histograms of the mean squared rotation and translation errors plotted versus azimuth, elevation, and in-plane rotations for each object. With the exception of the car, all objects have low mean translation error in azimuth. The teapot, bridge, and cup show low azimuth error on average. The bridge shows high error for the azimuth that corresponds to a view of a single plane, due to errors in PnP alignment for full planar surfaces. Translation errors versus elevation and azimuth are higher for the creamer, as the lack of a distinction between the lid and the jar in the 3D model causes smaller scale renders to align with the lower part of the creamer. The teapot shows high error for lower elevations where the top edge of the knob resembles the lower edge. For most objects, low error is shown for in-plane rotations.

Example 2

—Evaluation

To evaluate the precision of alignment for varying numbers of levels, a set of 324 template images of the stuffed toy bird model were selected, rendered using 36 samples in azimuth spaced 10° apart, 3 samples in elevation spaced 20° apart, and 3 samples in in-plane rotations spaced 20° apart, 1 sample in scale. The 3240 ground truth images of the 3D model of the stuffed toy bird were rendered using the same translation and same samples in scale, elevation and in-plane rotation as the template images, and using 360 samples in azimuth spaced 1° apart. To test invariance to illumination, a different illumination environment was used to render the ground truth images from one used to render the template images. Each ground truth rendered image was assigned to the nearest two templates from the set of 324 templates, and a multi-level alignment approach as described herein was applied with varying numbers of levels (i.e., varying L) to obtain the best match from the two templates. The errors were obtained in the estimated rotation and translation from the ground truth rotation and translation for each choice of L. The ground truth renders were categorized according to their deviation in azimuth angle from the best matching template, and the mean squared errors over each value of deviation were obtained.

Figure 13:
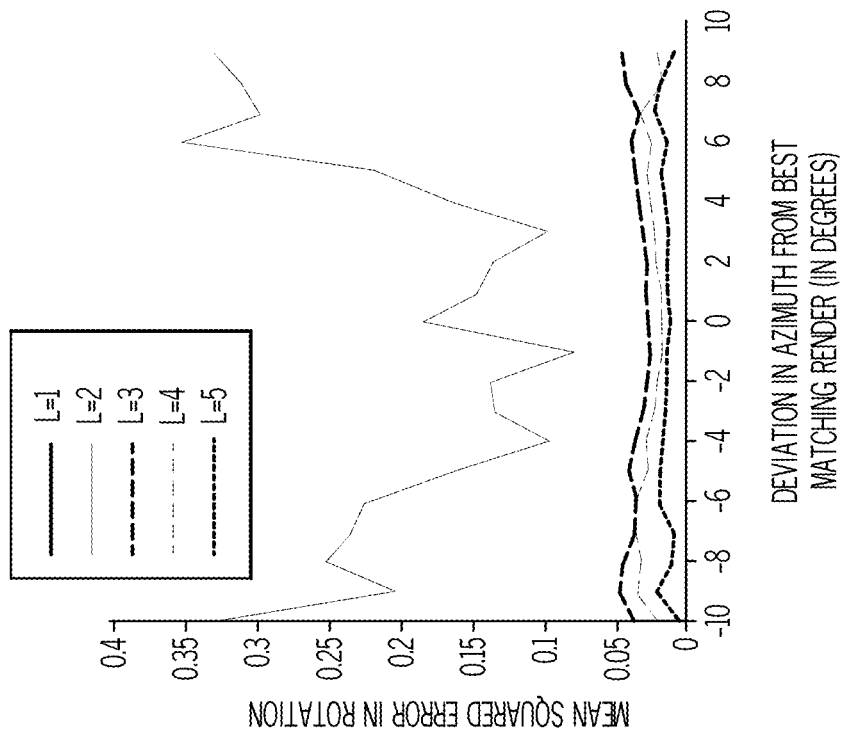
FIG. 13 depicts a histogram of an illustrative mean squared rotation and translation error versus deviation in azimuth from the best matching render according to one or more embodiments shown and described herein.
Figure 13:
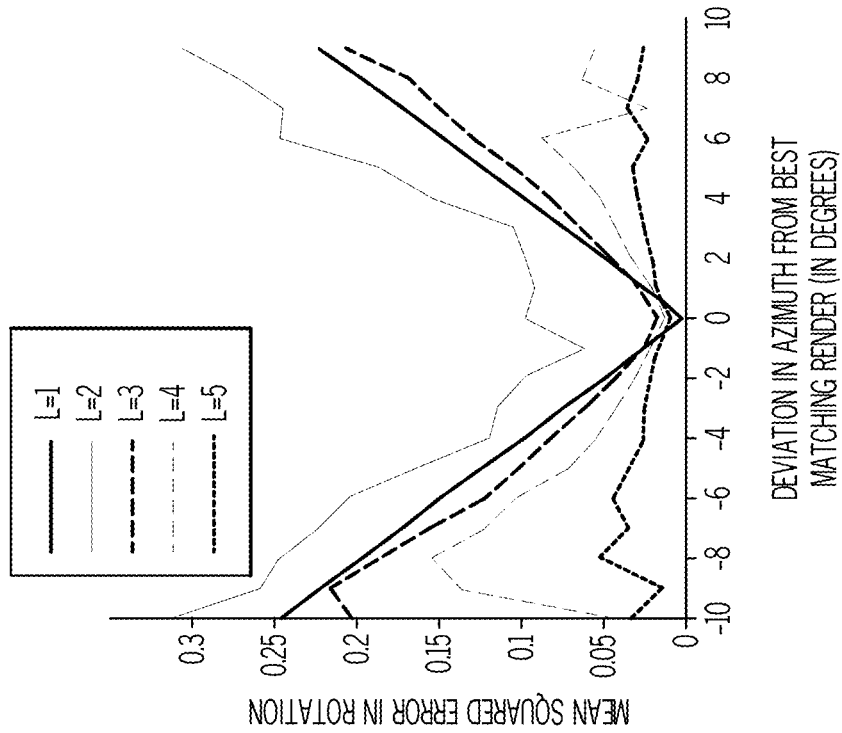

FIG. 13 depicts plots of the mean squared rotation and translation errors versus deviation in azimuth angle. With the exception of the 1-level tree, increasing L reduces the error at the deviation of 0°, i.e., when the ground truth render precisely corresponds to a template render. For the 1-level tree, a simple assignment of the best matching template rotation and translation to the ground truth render is completed, which introduces 0 rotation error for the ground truth render at 0°, and zero translation errors for all renders. For L=2 and upwards, small patch misalignments of up to 1 pixel were observed, due to similar local edge gradients that introduce small deviations in PnP alignment at the 0° deviation mark. For higher deviations from 0°, increasing L reduces the rotation error significantly. At L=5, the slope of the rotation error graph is small. As such, for the second fine matching step described herein, L=5 is used.

Accordingly, it should now be understood that the systems and methods described herein quickly and accurately determine the pose of a textureless object such that the textureless object can be appropriately grasped, manipulated, moved, and/or the like by a robotic device without causing the textureless object to be dropped, be improperly handled, and/or the like. The systems and methods described herein estimate the pose by aligning a 3D model of the textureless object to a single image of the textureless object by sampling the space of poses around the 3D model, which is populated by rendering the 3D model from a plurality of viewpoints and scales.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system to output a pose of a textureless object, the system comprising:
   a processing device; and
   a non-transitory, processor-readable storage medium, the non-transitory, processor-readable storage medium comprising one or more programming instructions that, when executed, cause the processing device to:
   obtain a single image of the textureless object, wherein the pose of the textureless object is inferred from the single image;
   generate a three dimensional model of the textureless object from a plurality of viewpoints and a plurality of scales obtained from image data of the textureless object;
   extract a plurality of patches from each of a plurality of discretized renders of the three dimensional model, wherein the plurality of patches comprises a plurality of high-level patches and a plurality of low-level patches;
   link each one of the plurality of high-level patches to at least one of the plurality of low-level patches to construct a multi-level illumination invariant tree structure;
   match the single image with a discretized render of the three dimensional model via the multi-level illumination invariant tree structure to obtain an alignment of the single image with the discretized render; and
   output the pose of the textureless object based on the alignment.

2. The system of claim 1, further comprising a robotic device that grasps the textureless object based upon the estimated pose of the textureless object.

3. The system of claim 1, further comprising one or more imaging devices communicatively coupled to the processing device, wherein the one or more programming instructions that, when executed, cause the processing device to obtain the single image further cause the processing device to obtain the single image from the one or more imaging devices.

4. The system of claim 3, wherein the one or more imaging devices comprises a plurality of imaging devices, wherein each of the plurality of imaging devices has an optical axis, and individual imaging devices of the plurality of imaging devices are oriented such that each respective optical axis is at a different angle relative to a picking surface supporting the textureless object.

5. The system of claim 3, wherein the one or more imaging devices comprises a single imaging device having an optical axis, wherein the single imaging device rotates about a central axis such that the optical axis is continuously reoriented to a plurality of different angles relative to a picking surface supporting the textureless object.

6. The system of claim 1, wherein the one or more programming instructions that, when executed, cause the processing device to generate the three dimensional model further cause the processing device to:
   obtain a plurality of images from each of a plurality of viewpoints and each of the plurality of scales around the textureless object to obtain a plurality of templates; and
   vectorize the plurality of templates with a plurality of patches.

7. The system of claim 1, wherein the multi-level illumination invariant tree structure is represented by:

$$\max_{x_{11}} \begin{pmatrix} p(x_{11}|I) \max_{x_{21}}(p(x_{21}|x_{11},I)) \max_{x_{31}}(p(x_{31}|x_{21},I)) \\ \max_{x_{32}}(p(x_{32}|x_{21},I) \max_{x_{22}}(p(x_{22}|x_{11},I)) \\ \max_{x_{33}}(p(x_{33}|x_{22},I)) \max_{x_{34}}(p(x_{34}|x_{22},I) \end{pmatrix},$$

where p represents a probability, $x_{11}$, $x_{21}$, $x_{22}$, $x_{31}$, $x_{32}$, $x_{33}$, and $x_{34}$ each represent a location of one of the plurality of patches in the single image, and I represents a set of Laplacian of Gaussian (LoG) representations of the image data.

8. The system of claim 7, wherein a conditional probability of a child $x_{21}$ given a parent $x_{11}$ of the child $x_{21}$ is represented by:

$$p(x_{21}|x_{11},I)=p(I|x_{21},x_{11})p(x_{21}|x_{11})/Z,$$

where $p(x_{21}|x_{11})$ represents a prior probability of knowing a location of the child $x_{21}$ given a location $x_{11}$ of the parent $x_{11}$, $p(I|x_{21}, x_{11})$ represents a data likelihood of finding a location $x_{21}$ of the one of the plurality of patches in the single image, and Z represents evidence that ordinarily forces $\Sigma_{x_{21}} p(x_{21}|x_{11}, I)$ to equal 1.

9. The system of claim 1, wherein the one or more programming instructions that, when executed, cause the processing device to match the single image with the discretized render further cause the processing device to align a rotation and translation of the three dimensional model to the single image via a random sample consensus.

10. A method to output a pose of a textureless object, the method comprising:
    obtaining, by a processing device, a single image of the textureless object, wherein the single image indicates the pose of the textureless object;
    generating, by the processing device, a three dimensional model of the textureless object from a plurality of viewpoints and a plurality of scales obtained from image data of the textureless object;
    matching, by the processing device, the single image with a discretized render of the three dimensional model via a multi-level illumination invariant tree structure to obtain an alignment of the single image with the discretized render; and
    outputting, by the processing device, the pose of the textureless object based on the alignment.

11. The method of claim 10, further comprising directing, by the processing device, a robotic device to grasp the textureless object based upon the estimated pose of the textureless object.

12. The method of claim 10, wherein obtaining the single image further comprises obtaining the single image from one or more imaging devices communicatively coupled to the processing device.

13. The method of claim 10, wherein generating the three dimensional model comprises:
   obtaining a plurality of images from each of a plurality of viewpoints and each of the plurality of scales around the textureless object to obtain a plurality of templates; and
   vectorizing the plurality of templates with a plurality of patches.

14. The method of claim 10, further comprising:
   extracting, by the processing device, a plurality of patches from each of a plurality of discretized renders of the three dimensional model, wherein the plurality of patches comprises a plurality of high-level patches and a plurality of low-level patches; and
   linking, by the processing device, each one of the plurality of high-level patches to at least one of the plurality of low-level patches to construct the multi-level illumination invariant tree structure.

15. The method of claim 14, wherein the multi-level illumination invariant tree structure is represented by:

$$\max_{x_{11}} \begin{pmatrix} p(x_{11} \mid I) \max_{x_{21}} (p(x_{21} \mid x_{11}, I)) \max_{x_{31}} (p(x_{31} \mid x_{21}, I)) \\ \max_{x_{32}} (p(x_{32} \mid x_{21}, I)) \max_{x_{22}} (p(x_{22} \mid x_{11}, I)) \\ \max_{x_{33}} (p(x_{33} \mid x_{22}, I)) \max_{x_{34}} (p(x_{34} \mid x_{22}, I) \end{pmatrix},$$

where p represents a probability, $x_{11}$, $x_{21}$, $x_{22}$, $x_{31}$, $x_{32}$, $x_{33}$, and $x_{34}$ represent locations of one of the plurality of patches in the single image, and I represents a set of Laplacian of Gaussian (LoG) representations of the image data.

16. The method of claim 15, wherein a conditional probability of a child $x_{21}$ given a parent $x_{11}$ of the child $x_{21}$ is represented by:

$$p(x_{21} \mid x_{11}, I) = p(I \mid x_{21}, x_{11}) p(x_{21} \mid x_{11}) / Z,$$

where $p(x_{21} \mid x_{11})$ represents a prior probability of knowing a location of the child $x_{21}$ given a location $x_{11}$ of the parent $x_{11}$, $p(I \mid x_{21}, x_{11})$ represents a data likelihood of finding a location $x_{21}$ of the one of the plurality of patches in the single image, and Z represents evidence that ordinarily forces $\Sigma_{x_{21}} P(x_{21} \mid x_{11}, I)$ to equal 1.

17. A system to direct a robotic device based on a pose of a textureless object, the system comprising:
   a processing device;
   one or more imaging devices communicatively coupled to the processing device;
   the robotic device communicatively coupled to the processing device;
   a picking surface supporting the textureless object; and
   a non-transitory, processor-readable storage medium, the non-transitory, processor-readable storage medium comprising one or more programming instructions that, when executed, cause the processing device to:
      obtain a single image of the textureless object from at least one of the one or more imaging devices, wherein the single image indicates the pose of the textureless object;
      generate a three dimensional model of the textureless object from a plurality of viewpoints and a plurality of scales obtained from image data of the textureless object generated by the one or more imaging devices;
      match the single image with a discretized render of the three dimensional model via a multi-level illumination invariant tree structure to obtain an alignment of the single image with the discretized render;
      estimate the pose of the textureless object based on the alignment; and
      direct the robotic device to move and grasp the textureless object based on the estimated pose.

18. The system of claim 17, wherein the one or more imaging devices comprises a plurality of imaging devices, wherein each of the plurality of imaging devices has an optical axis, and individual imaging devices of the plurality of imaging devices are oriented such that each respective optical axis is at a different angle relative to the picking surface supporting the textureless object.

19. The system of claim 17, wherein the one or more imaging devices comprises a single imaging device having an optical axis, wherein the single imaging device rotates about a central axis such that the optical axis is continuously reoriented to a plurality of different angles relative to the picking surface supporting the textureless object.

20. The system of claim 17, further comprising one or more programming instructions that, when executed, cause the processing device to:
   extract a plurality of patches from each of a plurality of discretized renders of the three dimensional model, wherein the plurality of patches comprises a plurality of high-level patches and a plurality of low-level patches; and
   link each one of the plurality of high-level patches to at least one of the plurality of low-level patches to construct the multi-level illumination invariant tree structure.

* * * * *